United States Patent
Cho et al.

(10) Patent No.: US 10,972,215 B2
(45) Date of Patent: Apr. 6, 2021

(54) METHODS AND APPARATUS FOR JOINT USE OF PROBABILISTIC SIGNAL SHAPING AND FORWARD ERROR CORRECTION

(71) Applicant: Nokia Solutions and Networks OY, Espoo (FI)

(72) Inventors: Joon Ho Cho, Holmdel, NJ (US); Peter J. Winzer, Aberdeen, NJ (US); Chandrasekhar Sethumadhavan, Old Bridge, NJ (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 16/295,089

(22) Filed: Mar. 7, 2019

(65) Prior Publication Data
US 2019/0280809 A1    Sep. 12, 2019

Related U.S. Application Data

(60) Provisional application No. 62/640,820, filed on Mar. 9, 2018.

(51) Int. Cl.
*H04L 1/00* (2006.01)
*H04B 10/516* (2013.01)
(Continued)

(52) U.S. Cl.
CPC ......... *H04L 1/0041* (2013.01); *H04B 10/516* (2013.01); *H04B 10/808* (2013.01); *H04L 1/0071* (2013.01); *H04L 25/03343* (2013.01)

(58) Field of Classification Search
CPC .................................................. H04L 1/0041
See application file for complete search history.

(56) References Cited

U.S. PATENT DOCUMENTS 6,347,071 B1 *  2/2002  Cupo ..................... H04L 5/023
                                                370/203
9,929,813 B1 *  3/2018  Batshon ............... H04B 10/516
(Continued)

OTHER PUBLICATIONS

G. Böcherer and R. Mathar, "Operating LDPC codes with zero shaping gap," 2011 IEEE Information Theory Workshop, Paraty, 2011, pp. 330-334.*

(Continued)

*Primary Examiner* — Steve N Nguyen
(74) *Attorney, Agent, or Firm* — Mendelsohn Dunleavy P.C.; Yuri Gruzdkov

(57) ABSTRACT

A communication system in which probabilistic signal shaping and FEC coding are jointly applied in a manner that enables the use of substantially any constellation template, e.g., a template in which the constellation symbols include a constellation symbol of zero amplitude and/or are arranged in an asymmetric manner. In an example embodiment, the transmitter's electronic encoder can be configured to apply two different respective shaping codes to the information bits and to the corresponding parity bits. The resulting shaped streams can then be appropriately multiplexed and transmitted over the optical communication channel to realize a significant shaping gain. Advantageously, the constellation template(s), two distribution matchers, and FEC code can be flexibly selected and/or adapted to achieve nearly optimal system operation under substantially arbitrary (e.g., arbitrarily bad) channel conditions.

22 Claims, 16 Drawing Sheets

(51) Int. Cl.
*H04L 25/03* (2006.01)
*H04B 10/80* (2013.01)

(56) References Cited

U.S. PATENT DOCUMENTS

| | | | |
|---|---|---|---|
| 10,069,519 B1* | 9/2018 | Millar | H03M 13/05 |
| 2007/0204205 A1* | 8/2007 | Niu | H03M 13/356 |
| | | | 714/780 |
| 2008/0012740 A1* | 1/2008 | Li | H03M 13/356 |
| | | | 341/107 |
| 2010/0052778 A1* | 3/2010 | Baranauskas | H03H 11/0433 |
| | | | 330/109 |
| 2010/0223526 A1* | 9/2010 | Hong | H04N 19/67 |
| | | | 714/755 |
| 2012/0076219 A1* | 3/2012 | Srinivasa | H04L 1/06 |
| | | | 375/260 |
| 2013/0259210 A1* | 10/2013 | Cornil | H04B 3/487 |
| | | | 379/22.02 |
| 2014/0143631 A1* | 5/2014 | Varanasi | G06F 11/1012 |
| | | | 714/763 |
| 2015/0139351 A1* | 5/2015 | Arambepola | H04L 1/0071 |
| | | | 375/295 |
| 2016/0261347 A1* | 9/2016 | Karar | H04B 10/5055 |
| 2016/0277145 A1* | 9/2016 | Grant | H03M 13/31 |
| 2018/0026725 A1* | 1/2018 | Cho | H04L 27/362 |
| | | | 714/776 |
| 2018/0267340 A1* | 9/2018 | Rohde | H04B 10/5561 |
| 2019/0215077 A1* | 7/2019 | Chien | H04L 25/03834 |

OTHER PUBLICATIONS

J. Cho, S. Chandrasekhar, X. Chen, G. Raybon and P. Winzer, "Probabilistic Constellation Shaping and Coding: Essential Elements for Capacity-Approaching Optical Communications," 2017 Asia Communications and Photonics Conference (ACP), Guangzhou, China, 2017, pp. 1-3.*

Dan Feng, Qi Li, B. Bai and X. Ma, "Gallager mapping based constellation shaping for LDPC-coded modulation systems," 2015 International Workshop on High Mobility Wireless Communications (HMWC), Xi'an, 2015, pp. 116-120.*

Böcherer, G., et al. "Bandwidth Efficient and Rate-Matched Low-Density Parity-Check Coded Modulation." arXiv preprint arXiv:1502.02733 (2015), pp. 1-13.

Antonelli, Cristian, et al. "Quantum limits on the energy consumption of optical transmission systems." Journal of Lightwave Technology 32.10 (2014): 1853-1860.

* cited by examiner

200

402

404

502

$p_0 X_0 + p_1 X_1 = 0$

504

160

1000

| INPUT BITS | OUTPUT BITS | CORRESPONDING OUTPUT AMPLITUDES | # OF 1s IN THE OUTPUT AMPLITUDE | # OF 3s IN THE OUTPUT AMPLITUDE | PROBABILITY OF OCCURRENCES |
|---|---|---|---|---|---|
| 00 | 000 | 111 | 3 | 0 | 1/4 |
| 01 | 001 | 113 | 2 | 1 | 1/4 |
| 10 | 010 | 131 | 2 | 1 | 1/8 |
|    | 100 | 133 | 2 | 1 | 1/8 |
| 11 | 011 | 311 | 1 | 2 | 1/16 |
|    | 101 | 313 | 1 | 2 | 1/16 |
|    | 110 | 331 | 1 | 2 | 1/16 |
|    | 111 | 333 | 0 | 3 | 1/16 |

METHODS AND APPARATUS FOR JOINT USE OF PROBABILISTIC SIGNAL SHAPING AND FORWARD ERROR CORRECTION

CROSS-REFERENCE TO RELATED APPLICATIONS

This application claims the benefit of U.S. Provisional Patent Application No. 62/640,820 filed on 9 Mar. 2018, and entitled "METHODS AND APPARATUS FOR JOINT USE OF PROBABILISTIC SIGNAL SHAPING AND FORWARD ERROR CORRECTION," which is incorporated herein by reference in its entirety.

BACKGROUND

Field

Various example embodiments relate to optical communication equipment and, more specifically but not exclusively, to methods and apparatus for joint use of probabilistic signal shaping and forward error correction (FEC).

Description of the Related Art

This section introduces aspects that may help facilitate a better understanding of the disclosure. Accordingly, the statements of this section are to be read in this light and are not to be understood as admissions about what is in the prior art or what is not in the prior art.

Probabilistic signal shaping can beneficially provide energy savings often referred to as the shaping gain. In a typical implementation of probabilistic signal shaping (e.g., probabilistic constellation shaping, PCS), constellation symbols of relatively large energy are transmitted less frequently than constellation symbols of relatively small energy. For example, when constellation symbols are transmitted over a linear communication channel with a rate of occurrence that approximates a continuous Gaussian distribution in every dimension of the operative constellation, the shaping gain can theoretically approach 1.53 dB.

A representative systematic FEC code is used to convert an input bit sequence into an expanded bit sequence (FEC codeword) by appending to the input bit sequence a corresponding set of parity bits. Some well-performing FEC codes are low-density parity-check (LDPC) codes. LDPC codes are linear block codes that have parity check matrices with a relatively small number of nonzero elements in each row and column. An LDPC decoder may use soft information during decoding, which information can be generated by a soft information detector, e.g., relying on a soft-output algorithm, such as the Viterbi algorithm, the Bahl-Cocke-Jelinek-Raviv algorithm, or a belief-propagation algorithm.

SUMMARY OF SOME SPECIFIC EMBODIMENTS

Practical systems that enable the use of both probabilistic signal shaping and FEC coding in a manner that can be tailored to the channel conditions presented to the corresponding transmitter and receiver are desirable.

Disclosed herein are various embodiments of a communication system in which probabilistic signal shaping and FEC coding are jointly applied in a manner that enables the use of substantially any constellation template, e.g., a template in which the constellation symbols include a constellation symbol of zero amplitude and/or are arranged in an asymmetric manner. In an example embodiment, the transmitter's electronic encoder can be configured to apply two different respective shaping codes to the information bits and to the corresponding parity bits. The resulting shaped streams can then be appropriately multiplexed and transmitted over the optical communication channel to realize a significant shaping gain. Advantageously, the constellation template(s), two distribution matchers, and FEC code can be flexibly selected and/or adapted to achieve nearly optimal system operation under substantially arbitrary (e.g., arbitrarily bad) channel conditions.

According to an example embodiment, provided is an apparatus comprising an optical data transmitter that comprises an optical front end and a digital signal processor, the digital signal processor being configured to: redundancy-encode an input data stream to generate a constellation-symbol stream; and drive the optical front end to cause a modulated carrier wavelength generated by the optical front end to carry the constellation-symbol stream; and wherein the digital signal processor comprises: a first shaping encoder configured to generate a first bit-word stream by encoding the input data stream; an FEC encoder configured to generate a parity data stream by encoding the first bit-word stream using an FEC code; a second shaping encoder configured to generate a second bit-word stream by encoding the parity data stream; and a multiplexing circuit configured to generate the constellation-symbol stream in response to the first and second bit-word streams.

According to another example embodiment, provided is a communication method, comprising the steps of: configuring a digital signal processor to perform redundancy-encoding of an input data stream to generate a constellation-symbol stream; and configuring the digital signal processor to generate an electrical output signal suitable for driving an optical front end of an optical data transmitter in a manner that causes a modulated carrier wavelength generated by the optical front end to carry the constellation-symbol stream; and wherein said redundancy-encoding comprises the sub-steps of: generating a first bit-word stream by encoding the input data stream using a first shaping encoder; generating a parity data stream by encoding the first bit-word stream using an FEC encoder; generating a second bit-word stream by encoding the parity data stream using a second shaping encoder; and generating the constellation-symbol stream in response to the first and second bit-word streams using a multiplexing circuit.

BRIEF DESCRIPTION OF THE DRAWINGS

Other aspects, features, and benefits of various disclosed embodiments will become more fully apparent, by way of example, from the following detailed description and the accompanying drawings, in which.

DETAILED DESCRIPTION

Figure 1:
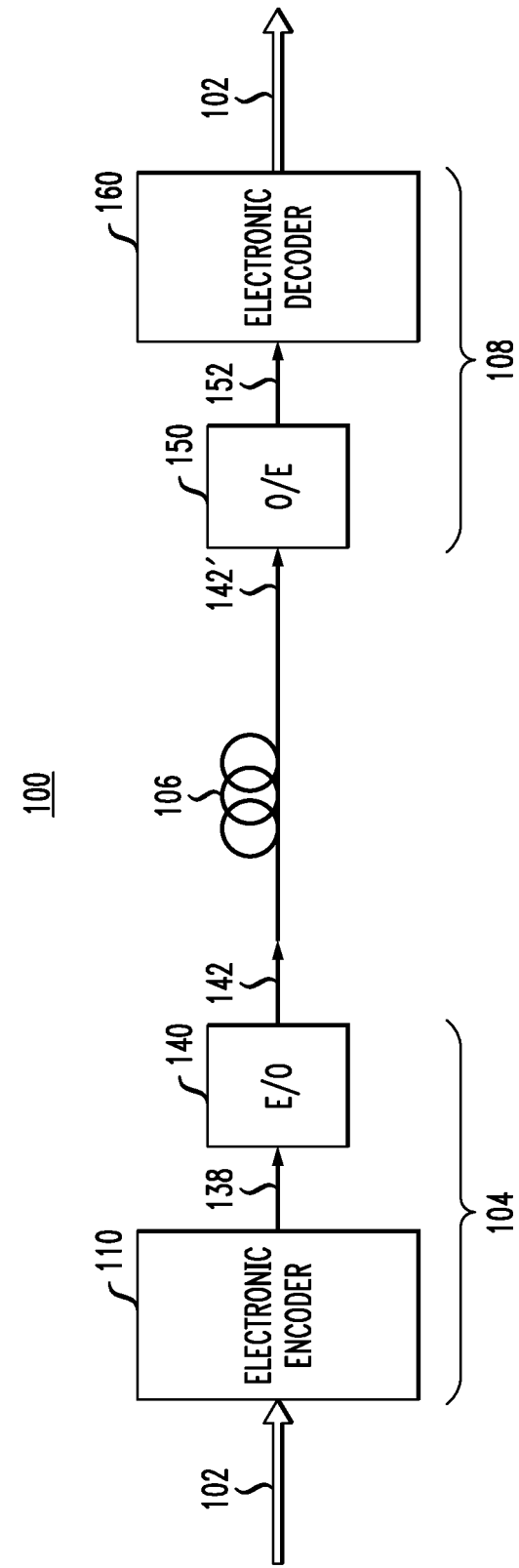
FIG. 1 shows a block diagram of a communication system in which various embodiments can be practiced.

Herein, the generation and/or transmission of a symbol stream in which various symbols appear with different probabilities even though the various input data segments encoded onto said symbol stream have about equal probabilities is referred to as probabilistic constellation shaping (PCS). Often, preferable types of PCS generate symbol streams in which higher energy symbols are less probable than lower energy symbols. In some embodiments, forward-error-correction (FEC) encoding may be used in a manner that causes such energy shaping to be largely maintained in the corresponding FEC-encoded symbol stream. In embodiments of coherent optical fiber communication systems and optical data transmitters and receivers thereof, the PCS can advantageously be used to (i) lower degradations related to nonlinear optical effects, which are more prominent at larger energies, (ii) lower a required signal-to-noise ratio (SNR), and/or (iii) enable higher information communication rates. Various embodiments may apply the PCS to various quadrature amplitude modulation (QAM) constellations and/or other suitable symbol constellations.

An important benefit of probabilistic signal shaping is that the amount of shaping (e.g., specific characteristics of the corresponding shaping code) can be selected to optimize a desired set of performance characteristics of any given channel. For example, depending on specified performance requirements, adjustable probabilistic signal shaping with an adjustable symbol rate can be used to achieve an optimal (e.g., the highest) spectral efficiency or an optimal (e.g., the highest) net bit-rate for any given transmission distance.

Probabilistic signal shaping can also be applied to communication channels that are receive-power constrained in addition to or instead of being transmit-power constrained.

When a systematic FEC (e.g., LDPC) encoder is used to encode the output of a shaping encoder (also sometimes referred to as a distribution matcher, DM), each of the resulting FEC codewords contains a "shaped" set of information bits and the corresponding "unshaped" set of parity bits. The shaping encoder causes the shaped set of information bits to contain bit-words the values of which have a non-uniform rate of occurrence and form a distribution histogram in accordance with the operative shaping code. In contrast, the FEC encoder typically causes the statistical properties of the unshaped set (e.g., block) of parity bits to be similar to those of a random or pseudo-random data sequence. When parsed into bit-words, the unshaped set of parity bits typically contains bit-words the values of which have a substantially uniform (e.g., constant) rate of occurrence. If both (shaped and unshaped) sets of the bit-words are transmitted over the communication channel without any additional processing, then the transmission of unshaped parity bits may significantly and adversely affect the overall effective shaping gain realized in the corresponding communication system.

FIG. 1 shows a block diagram of a communication system 100 in which various embodiments can be practiced. System 100 comprises an optical data transmitter 104 and an optical data receiver 108 that are coupled to one another by way of a communication link 106. In an example embodiment, communication link 106 can be implemented using an optical fiber or a fiber-optic cable.

System 100 carries out probabilistic signal shaping and forward error correction using (i) an electronic encoder 110 appropriately interfaced with an electrical-to-optical (E/O) converter (also sometimes referred-to as the optical transmitter front end) 140 at transmitter 104, and (ii) an optical-to-electrical (O/E) converter (also sometimes referred-to as the optical receiver front end) 150 appropriately interfaced with an electronic decoder 160 at receiver 108.

Some embodiments are compatible with orthogonal frequency-division multiplexing (OFDM) and/or discrete multitone (DMT) modulation.

Figure 17:
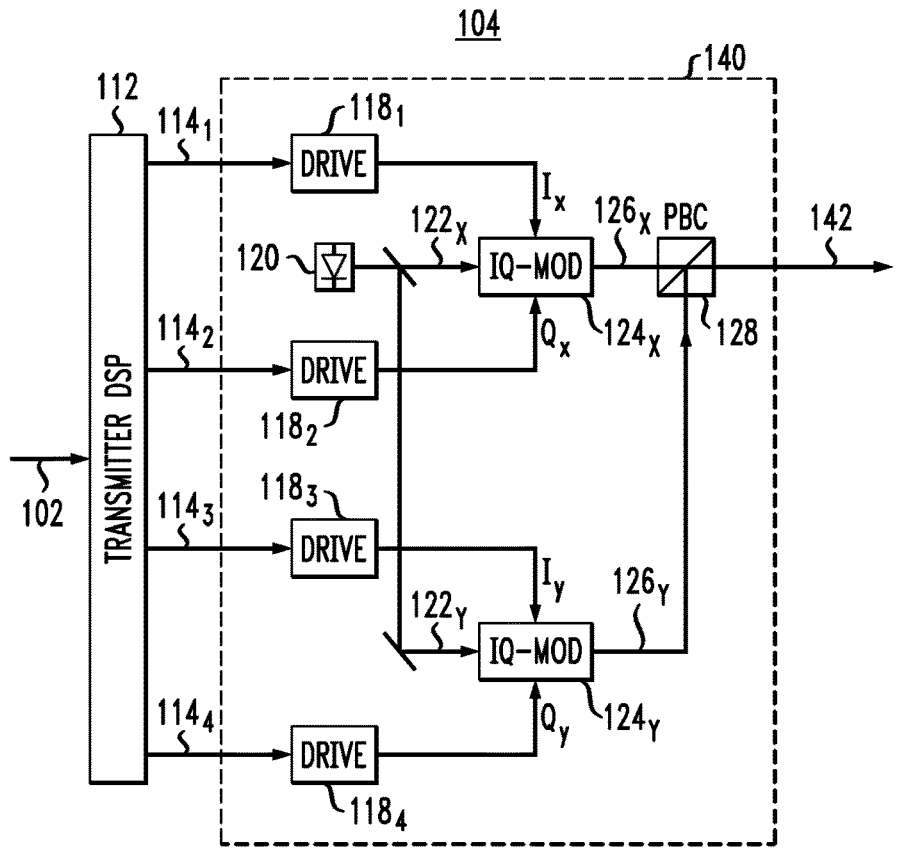
FIG. 17 shows a block diagram of an optical transmitter that can be used in the communication system of FIG. 1 according to an embodiment.
Figure 18:
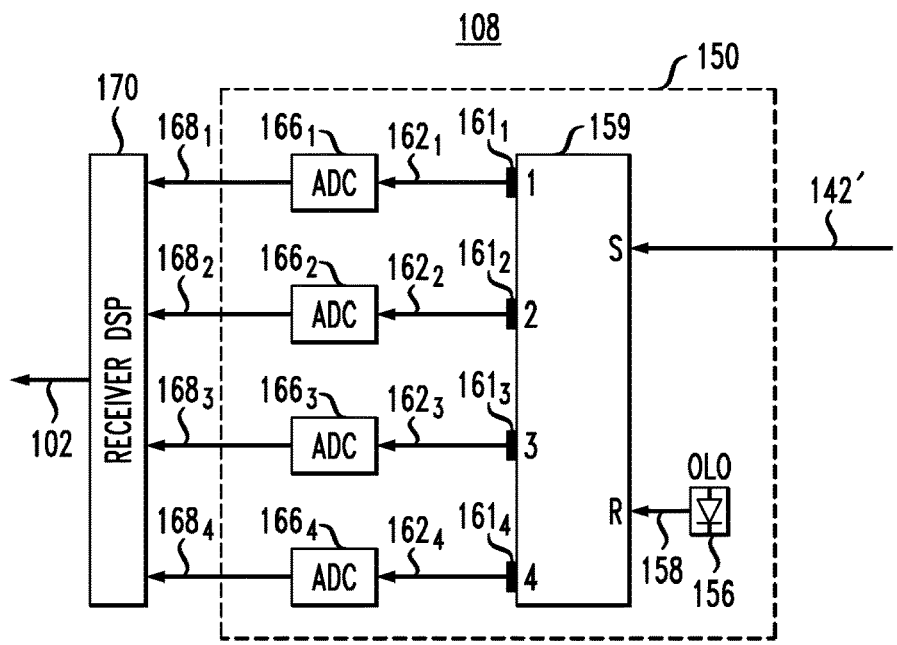
FIG. 18 shows a block diagram of an optical receiver that can be used in the communication system of FIG. 1 according to an embodiment.

In an example embodiment, one or both of electronic encoder 110 and electronic decoder 160 can be implemented using a respective digital signal processor (DSP, see FIGS. 17-18).

Electronic encoder 110 operates to generate an electrical radio-frequency (RF) signal 138 in response to receiving input data 102. In response to electrical RF signal 138, E/O converter 140 generates a corresponding modulated optical signal 142 suitable for transmission over link 106 and having encoded thereon the input data 102. In an example embodiment, E/O converter 140 is an optical modulator that can be implemented as known in the art using: (i) a laser configured to generate an optical carrier wave; (ii) a modulator configured to generate modulated optical signal 142 by modulating the optical carrier wave generated by the laser; and (iii) a driver circuit configured to electrically drive the modulator using electrical RF signal 138, thereby causing the E/O converter 140 to generate modulated optical signal 142. Depending on the embodiment, the modulator used in E/O converter 140 can be implemented using one or more optical IQ modulators, Mach-Zehnder modulators, amplitude modulators, phase modulators, and/or intensity modulators (e.g., see FIG. 17). In some embodiments, E/O converter 140 can employ directly modulated lasers, e.g., laser diodes configured to generate modulated optical signals in response to modulated electrical currents that drive the diodes.

Link 106 typically imparts noise and other linear and/or nonlinear signal impairments onto signal 142 and delivers a resulting impaired (e.g., noisier) signal 142' to O/E converter 150 of receiver 108. O/E converter 150 operates to convert optical signal 142' into a corresponding electrical RF signal 152. Electronic decoder 160 then uses decoding processing to convert electrical RF signal 152 into output data 102.

In some embodiments, O/E converter 150 is an optical demodulator that can be configured as known in the pertinent art for coherent (e.g., intradyne or homodyne) detection of signal 142'. In such embodiments, O/E converter 150 may include: (i) an optical local-oscillator (LO) source; (ii) an optical hybrid configured to optically mix signal 142' and the LO signal generated by the optical LO source; and (iii) one or more photodetectors configured to convert the optical interference signals generated by the optical hybrid into the corresponding components of electrical RF signal 152.

In some other embodiments, O/E converter 150 is an optical demodulator that can be configured for direct (e.g., square law, intensity, optical power) detection of signal 142'. In such embodiments, O/E converter 150 may include a photodiode configured to generate electrical RF signal 152 such that it is proportional to the intensity (optical power, squared amplitude of the electric field) of signal 142'.

Figure 2:
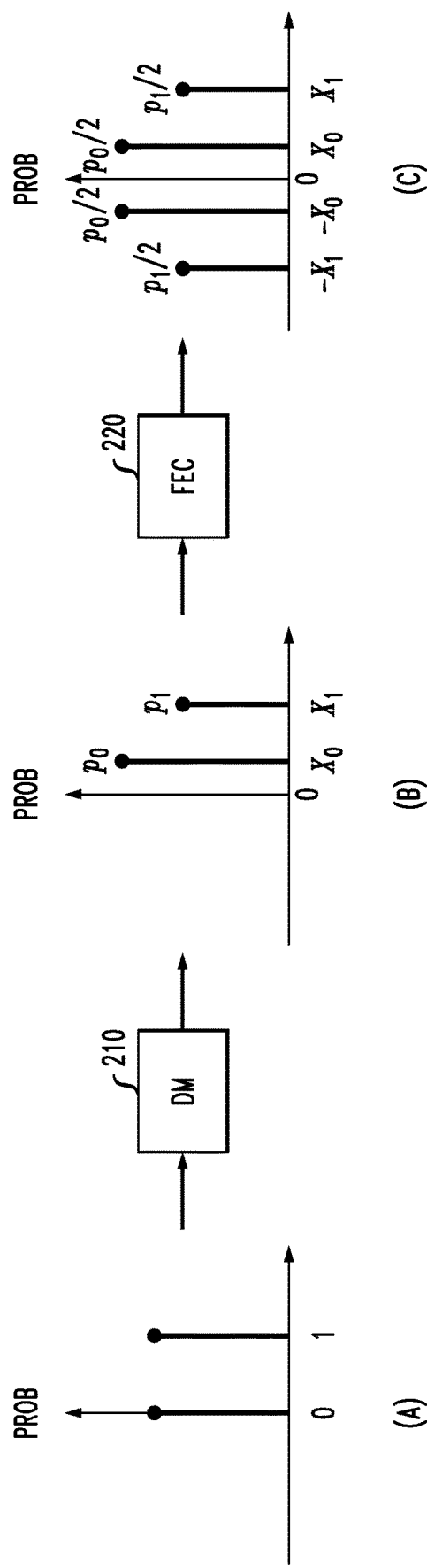
FIG. 2 graphically illustrates a conventional probabilistic amplitude-shaping (PAS) scheme that can be used in the communication system of FIG. 1.

FIG. 2 graphically illustrates a conventional probabilistic amplitude-shaping (PAS) scheme 200 that can be used in system 100.

As depicted by the panels (A)-(B) of FIG. 2, the PAS scheme 200 first transforms source bits of equal probabilities into positive-amplitude symbols $X_0$ and $X_1$ of unequal probabilities $p_0$ and $p_1$ by using a distribution matcher (DM) 210 in each of the in-phase and quadrature dimensions. In addition, the source bits of panel (A) are encoded by an FEC encoder 220, thereby generating parity bits (e.g., the binary 0's and 1's occurring with substantially equal probabilities). These parity bits are then presented as "+1" and "−1" and are used to multiply the shaped signal bits such that the positive-amplitude symbols $X_0$ and $X_1$ can be flipped around zero to produce $-X_0$ and $-X_1$ (as indicated in the panel (C) of FIG. 2). A complete (positive and negative) shaped constellation is thereby constructed as shown in the panel (C). Note that this constellation is symmetric with respect to zero.

Figure 3:
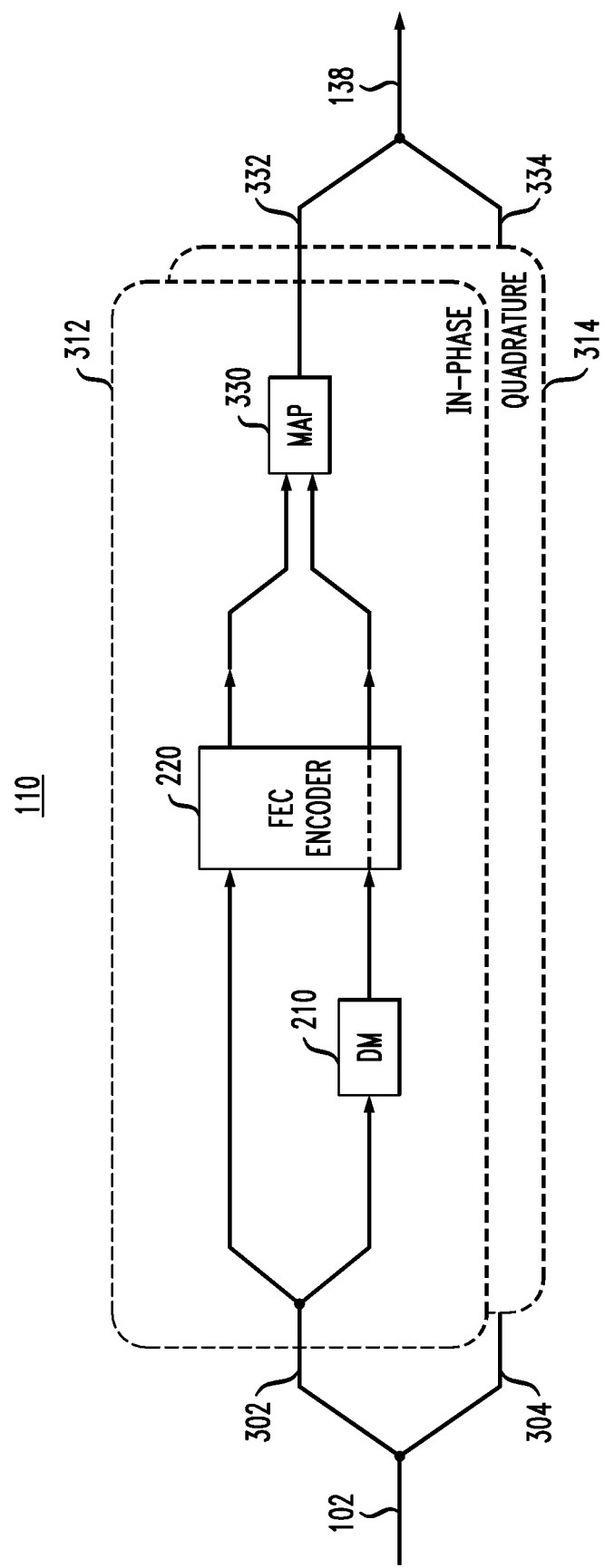
FIG. 3 shows a block diagram of a conventional embodiment of an electronic encoder that can be used to implement the PAS scheme of FIG. 2.

FIG. 3 shows a block diagram of a conventional embodiment of encoder 110 that is configured to implement the PAS scheme 200 of FIG. 2. In accordance with the PAS scheme 200, this embodiment of encoder 110 operates by (i) using an FEC code to encode the bit-words (binary labels) corresponding to the amplitudes of constellation symbols and (ii) placing the resulting parity bits into the sign bits of the constellation symbols.

More specifically, this embodiment of encoder 110 operates to demultiplex the input data stream 102 into data streams 302 and 304, which are then directed to nominally identical encoders 312 and 314, respectively. The encoders 312 and 314 operate to convert the data streams 302 and 304 into signed amplitude streams 332 and 334, respectively. The signed amplitude streams 332 and 334 are then used to generate the stream of complex values 138, wherein each constituent complex value has a corresponding signed amplitude of the stream 332 as the real part thereof and a corresponding signed amplitude of the stream 334 as the imaginary part thereof.

Encoder 312 comprises the DM 210 and FEC encoder 220, the basic functions of which are described above in reference to FIG. 2. Encoder 312 further comprises a mapper (MAP) 330 configured to generate the signed amplitudes for the stream 332 by (i) mapping the shaped bit-words generated by DM 210 onto the corresponding PAM constellation, thereby generating the corresponding positive amplitude values and (ii) pre-pending to the positive amplitude values, as sign bits, the parity bits generated by FEC encoder 220.

Encoder 314 has a similar structure and operates in a similar manner to generate the stream 334 in response to the stream 304.

Note that the embodiment of encoder 110 shown in FIG. 3 is only compatible with some constellations having certain well-defined characteristics. For example, the employed constellation needs to have symmetry around the origin and cannot have a constellation symbol located at the origin (e.g., see FIG. 2).

FIGS. 4-5 graphically shows example shaped constellations with which the embodiment of encoder 110 shown in FIG. 3 is incompatible. However, these constellations are compatible with at least some encoder embodiments disclosed herein.

Figure 4A:
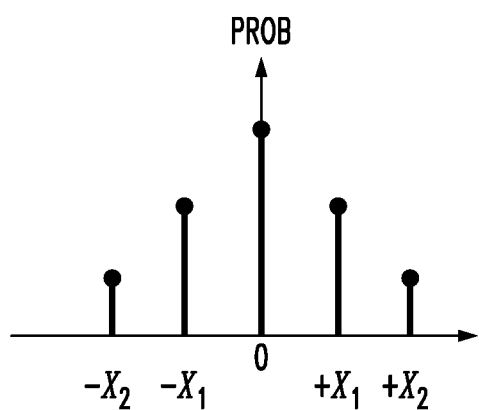
FIGS. 4-5 graphically show example constellations with which the embodiment of the electronic encoder shown in FIG. 3 is incompatible. However, these constellations are compatible with at least some encoder embodiments disclosed herein.
Figure 4B:
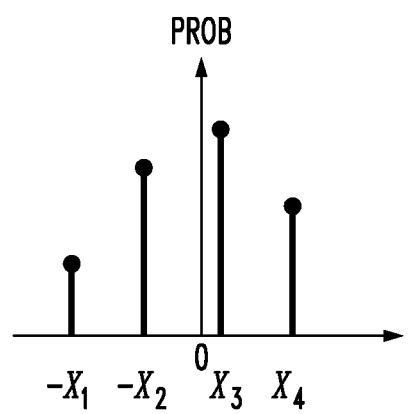

For example, a constellation 402 shown in FIG. 4A includes a constellation symbol located at zero. A constellation 404 shown in FIG. 4B does not have symmetry around the origin.

The inability of the PAS scheme 200 (FIG. 2) and the corresponding encoders/decoders (e.g., as exemplified by FIG. 3) to use asymmetric constellations or zero symbols is a weakness that can cause significant problems for the equipment operator and/or supplier.

Example embodiments disclosed herein below provide technical solutions that allow the corresponding embodiments of encoder 110 to be constructed in a manner that removes at least some of the above-indicated constellation restrictions and permits the creation and use of modulation formats that are of practical relevance for the transmission systems in which asymmetric constellations and/or zero symbols may need to be used.

At least some embodiments can also be used to generate symmetric probabilistically shaped QAM and/or PAM constellations.

Some embodiments provide practically feasible and near-optimum methods for using any given constellation template to implement probabilistic constellation shaping (PCS), while still being able to separately apply FEC coding without detrimentally affecting the shaping gain.

Figure 5A:
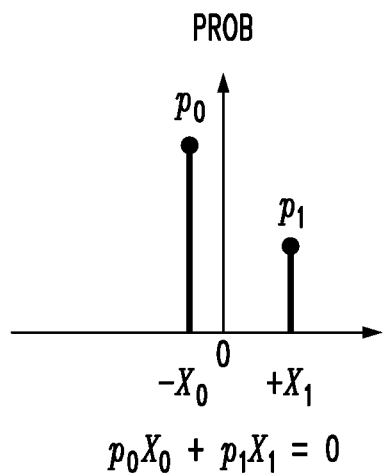

For example, some embodiments can be used to generate binary and quaternary PCS modulation formats that achieve better receiver sensitivities than the QPSK. For a binary PCS modulation format with symbol probabilities $p_0$ and $p_1$, one can use, respectively, the amplitudes $X_0$ and $X_1$ to implement generalized ON-OFF-Keying (G-OOK). Alternatively, one can adjust symbol amplitudes $X_0$ and $X_1$ such that the signal becomes zero-mean, i.e., $p_0X_0+p_1X_1=0$, e.g., as indicated in FIG. 5A. This can be achieved, e.g., by assigning $X_0=-Ap_1$ and $X_1=Ap_0$ with an appropriately chosen scaling factor A. The resulting constellation 502 can be referred to as probabilistically shaped 2-ary asymmetric PAM (PS 2-APAM).

Figure 5B:
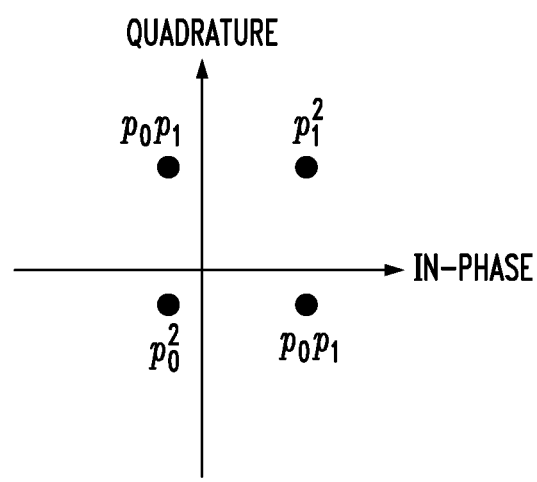

By orthogonally multiplexing two PS 2-APAMs, one can construct a probabilistically shaped 4-ary asymmetric QAM (PS 4-AQAM) constellation 504, e.g., as shown in FIG. 5B.

Advantageously, some embodiments employing PS 2-APAM and/or PS 4-AQAM constellations can achieve better receiver sensitivity than comparable systems configured to use the QPSK. Furthermore, by adjusting the probabilities $p_0$ and $p_1$ through the use of an appropriately configured DM, the overall modulation scheme can be flexibly adapted to a substantially arbitrary (e.g., arbitrarily bad) channel condition.

Figure 6:
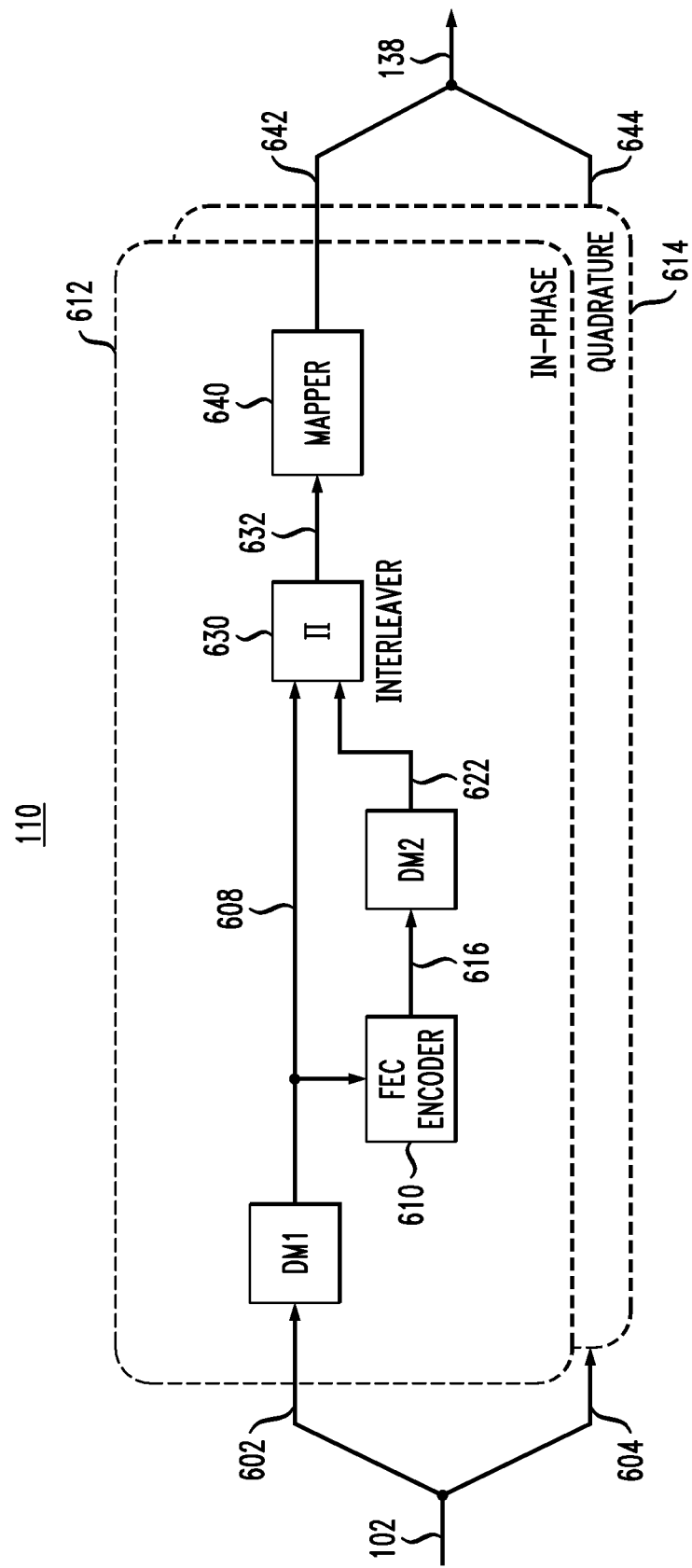
FIG. 6 shows a block diagram of an electronic encoder that can be used in the communication system of FIG. 1 according to an embodiment.

FIG. 6 shows a block diagram of encoder 110 (FIG. 1) according to an embodiment.

This embodiment of encoder 110 operates to demultiplex the input data stream 102 into data streams 602 and 604, which are then directed to nominally identical electronic encoders 612 and 614, respectively. The encoders 612 and 614 operate to convert the data streams 602 and 604 into signed amplitude streams 642 and 644, respectively. The signed amplitude streams 642 and 644 are then used to generate the stream of complex values 138, wherein each constituent complex value has a corresponding signed amplitude of the stream 642 as the real part thereof and a corresponding signed amplitude of the stream 644 as the imaginary part thereof.

Encoder 612 comprises shaping encoders (distribution matchers, DMs) DM1 and DM2, an FEC encoder 610, an interleaver (Π) 630, and a constellation mapper 640. Encoder 614 has a similar structure (not explicitly shown on FIG. 6). In an example embodiment, each of input data streams 602 and 604 has approximately equal probabilities of occurrence for the bits "0" and "1" therein.

In operation, shaping encoder DM1 transforms input data stream 602 into a stream 608 of probabilistically shaped (PS) bit-words, wherein at least some bit-words have unequal probabilities of occurrence. More specifically, shaping encoder DM1 outputs bit-words 608, which although not yet mapped to constellation symbols, are generated such that the corresponding stream of constellation symbols will have the desired symbol distribution after being interleaved with the shaped parity bits and constellation mapped, e.g., as explained below. FEC encoder 610 applies a systematic FEC code to stream 608 to generate, e.g., in a conventional manner, a corresponding stream 616 of parity bits. As already indicated above, stream 616 typically has approximately equal probabilities of occurrence for the bits "0" and "1" therein. Shaping encoder DM2 transforms the stream 616 of parity bits into a corresponding stream 622 of PS bit-words, wherein at least some bit-words have unequal probabilities of occurrence.

Note that the streams 608 and 622 do not necessarily represent or correspond to the same symbol distribution, and do not necessarily use the same probabilities or even the same constellation grid. Interleaver 630 is optional and can be used to interleave the bit-word streams 608 and 622 such that the resulting interleaved bit-word stream 632 has an overall bit-word distribution that can be substantially stationary in time (e.g., does not significantly fluctuate on the relevant time scale, such as the time scale corresponding to one or several FEC-encoded data frames). Constellation mapper 640 then generates the signed amplitudes for the stream 642 by mapping the bit-words of the stream 632 onto the corresponding PAM constellation.

In some embodiments, interleaver 630 can be replaced by a suitable multiplexer.

Figure 7:
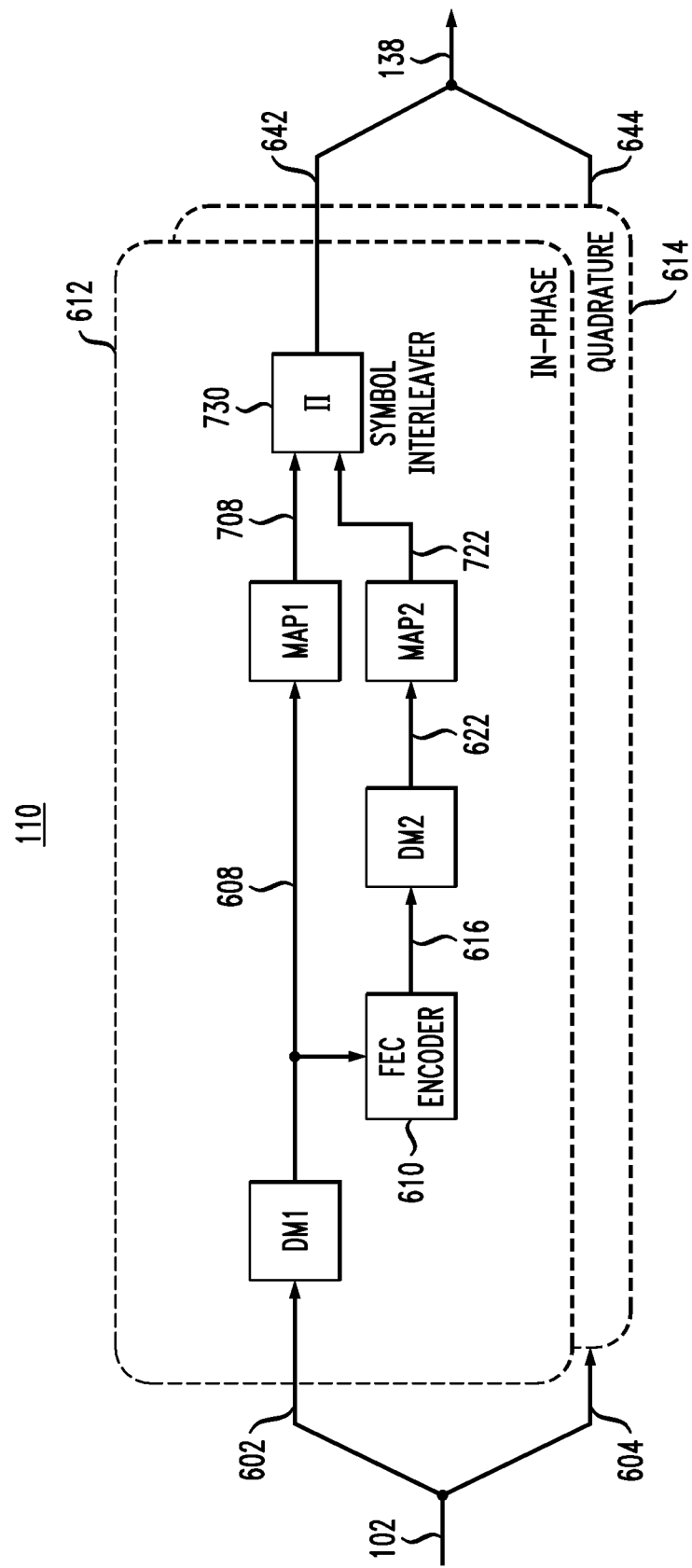
FIG. 7 shows a block diagram of an electronic encoder that can be used in the communication system of FIG. 1 according to an alternative embodiment.

FIG. 7 shows a block diagram of encoder 110 according to an alternative embodiment. In the embodiment of FIG. 7, the encoder 612 is modified with respect to the embodiment of FIG. 6 as follows: interleaver 630 and constellation mapper 640 of FIG. 6 are replaced by constellation mappers MAP1 and MAP2 and a symbol interleaver 730 connected as indicated in FIG. 7. Constellation mappers MAP1 and MAP2 may use different respective constellations. Symbol interleaver 730 operates to interleave constellation-symbol streams 708 and 722 received from constellation mappers MAP1 and MAP2, respectively, thereby generating the stream 642. In contrast, interleaver 630 operates to interleave bit-word streams 608 and 622 (see FIG. 6).

The encoder 614 of FIG. 7 is similarly modified with respect to the embodiment corresponding to FIG. 6 and operates in the above-described manner.

Figure 8:
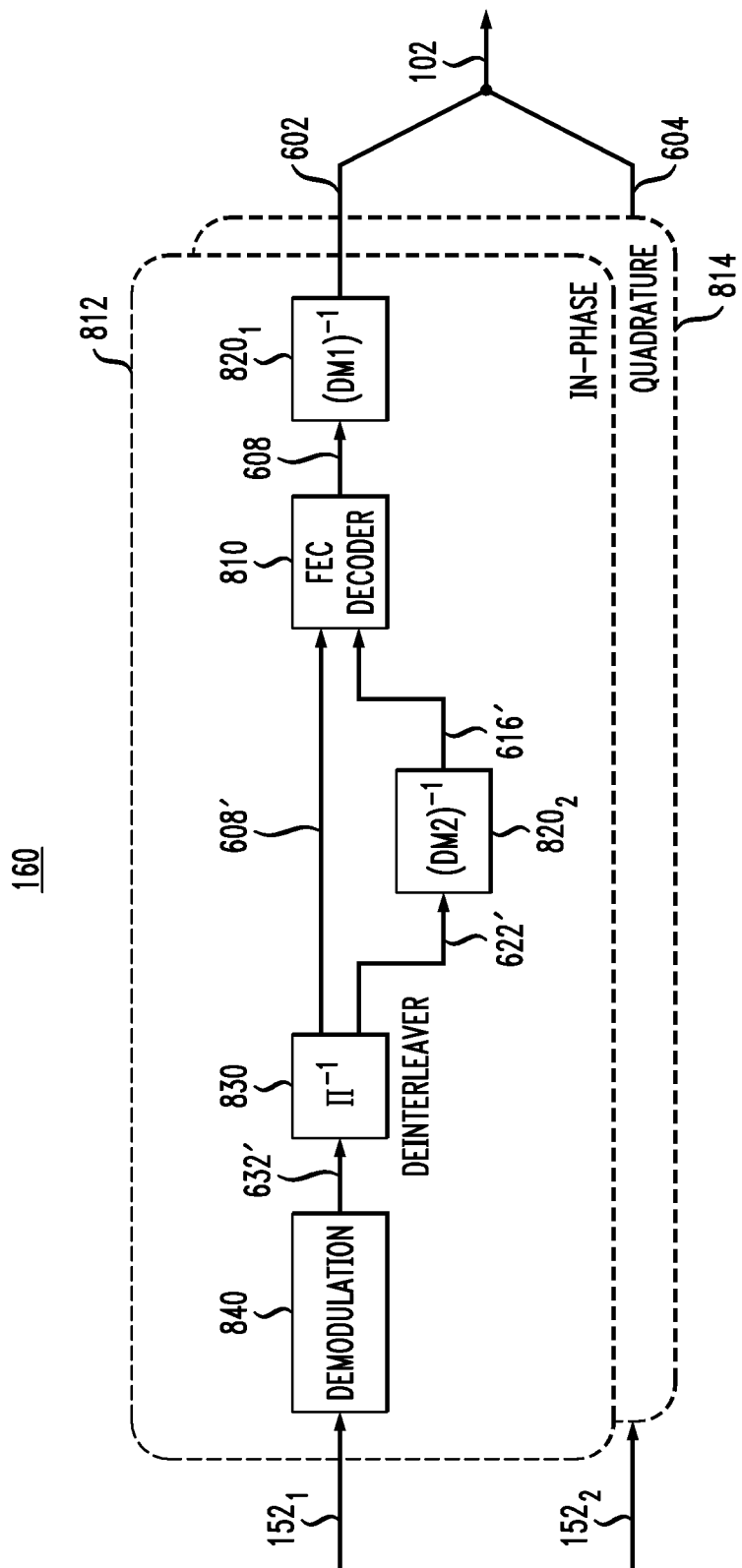
FIG. 8 shows a block diagram of an electronic decoder that can be used in the communication system of FIG. 1 according to an embodiment.

FIG. 8 shows a block diagram of electronic decoder 160 according to an embodiment. This embodiment of decoder 160 is compatible with the embodiment of encoder 110 shown in FIG. 6. Decoder 160 operates to recover data stream 102 (also see FIGS. 1 and 6) in response to receiving digital signals $152_1$ and $152_2$ from receiver front end 150. In an example embodiment, digital signal $152_1$ provides a stream of digitalizations representing measurements of an in-phase component of optical input signal 142', and digital signal $152_2$ provides a stream of digitalizations representing measurements of a quadrature component of optical input signal 142'.

Decoder 160 comprises decoders 812 and 814. Decoder 812 operates to recover data stream 602 in response to digital signal $152_1$. Decoder 814 similarly operates to recover data stream 604 in response to digital signal $152_2$. Data streams 602 and 604 are properly multiplexed to recover data stream 102. Decoders 812 and 814 can be implemented using nominally identical digital circuits.

Decoder 812 comprises a demodulation circuit 840, a deinterleaver ($\Pi^{-1}$) 830, a shaping decoder ($DM2^{-1}$) $820_2$, an FEC decoder 810, and a shaping decoder ($DM1^{-1}$) $820_1$ connected as indicated in FIG. 8.

In operation, demodulation circuit 840 uses the operative constellation, in a conventional manner, to convert the stream of digital values provided by digital signal $152_1$ into a corresponding bit-word stream 632'. Bit-word stream 632' may differ from bit-word stream 632 (FIG. 6) due to the detrimental effects of noise and linear and nonlinear distortions imposed by front ends 140 and 150 and/or communication link 106 (see FIG. 1). Deinterleaver 830 deinterleaves bit-word stream 632' by applying thereto the deinterleaving operation $\Pi^{-1}$ that is inverse to the interleaving operation $\pi$ performed by interleaver 630 (FIG. 6). The resulting deinterleaved streams are bit-word streams 608' and 622'. The presence of transmission errors in bit-word stream 632' may cause one or both of the bit-word streams 608' and 622' to differ from bit-word streams 608 and 622, respectively.

Shaping decoder $820_2$ converts the bit-word stream 622' into bit-word stream 616' by applying a transformation ($DM2^{-1}$) that is inverse to the transformation (DM2) performed by shaping encoder DM2. Bit-word stream 616' may differ from bit-word stream 616 for the above-indicated reasons.

FEC decoder 810 uses the operative FEC code to correct errors (if any) in bit-word stream 608', thereby recovering bit-word stream 608. For this error correction, FEC decoder 810 uses (i) bit-word stream 608' as information bits and (ii) bit-word stream 622' as parity bits. After the error correction, the parity bits are discarded.

Shaping decoder $820_1$ converts bit-word stream 608 into data stream 602 by applying a transformation ($DM1^{-1}$) that is inverse to the transformation (DM1) performed by shaping encoder DM1.

Decoder 814 generates data stream 604 in a similar manner.

Figure 9:
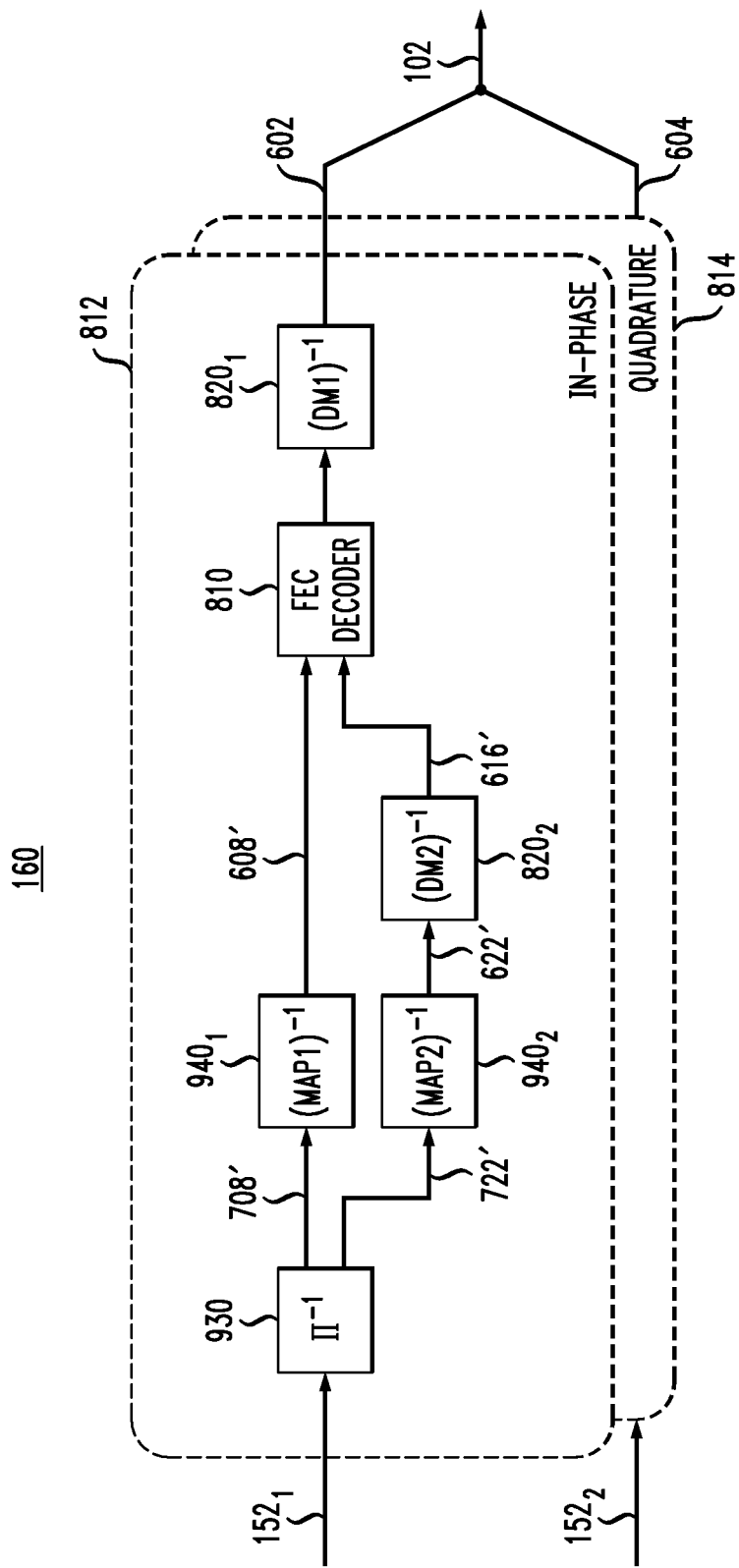
FIG. 9 shows a block diagram of an electronic decoder that can be used in the communication system of FIG. 1 according to an alternative embodiment.

FIG. 9 shows a block diagram of decoder 160 according to an alternative embodiment. This embodiment of decoder 160 is compatible with the embodiment of encoder 110 shown in FIG. 7. In the embodiment of FIG. 9, decoder 812 is modified with respect to the embodiment of FIG. 6 as follows: demodulation circuit 840 and deinterleaver 830 are replaced by deinterleaver 930 and demodulation circuits 9401 and 9402 connected as indicated in FIG. 9.

Deinterleaver 930 deinterleaves the digital samples of digital signal $152_1$ by applying thereto the deinterleaving operation $\Pi^{-1}$ that is inverse to the interleaving operation $\pi$ performed by interleaver 730 (FIG. 7). The resulting digital-sample streams are streams 708' and 722'. Streams 708' and 722' may differ from streams 708 and 722 (FIG. 7) due to the detrimental effects of noise and linear and nonlinear distortions imposed by front ends 140 and 150 and/or communication link 106 (see FIG. 1).

Demodulation circuit 9401 uses the same operative constellation as constellation mapper MAP1 (FIG. 7), in a conventional manner, to convert the stream of digital values provided by stream 708' into a corresponding bit-word stream 608'. Demodulation circuit 9402 similarly uses the same operative constellation as constellation mapper MAP2 (FIG. 7), in a conventional manner, to convert the stream of digital values provided by stream 722' into a corresponding bit-word stream 622'. Bit-word streams 608' and 622' are then processed as described above in reference to FIG. 8 to recover data stream 602.

Decoder 814 of FIG. 9 is similarly modified with respect to the embodiment corresponding to FIG. 8 and operates as described above.

Referring back to FIGS. 6-7, in an example embodiment, shaping encoder DM1 can be implemented using a distribution matcher substantially of any type, e.g., including but not limited to distribution matchers configured to carry out the constant composition distribution matching (CCDM) and/or the prefix-free code distribution matching (PCDM).

As for the implementation of shaping encoder DM2, some careful choices may need to be made due to the fact that the shaped parity bits should preferably lend themselves to being de-shaped as correctly (e.g., with as few errors) as possible, prior to the FEC decoding at the receiver in order to avoid detrimental error bursts. For example, one approach to the design of shaping encoder DM2 may be based on a trade-off between the robustness to noise for error-resilient de-shaping and the shaping efficiency in terms of the overall transmit-energy reduction. In general, shaping encoder DM2 does not necessarily need to rely on the same PCS method or code as shaping encoder DM1.

The following describes in more detail some example embodiments of shaping encoders DM1 and DM2.

Example 1

No shaping is performed in either shaping encoder DM1 or shaping encoder DM2, but different respective modulation formats used in conjunction with constellation mappers MAP1 and MAP2 (FIG. 7) are configured to achieve probabilistic shaping of the stream 642.

If shaping encoders DM1 and DM2 correspond to different unshaped PAM constellations, then source and parity bits can be modulated onto different constellations. This approach results in a time-division hybrid modulation (TDHM), wherein the payload and the FEC overhead specifically use different symbol constellations. In an example TDHM system, symbol constellations can be changed periodically or from time to time, irrespective of the payload and overhead considerations. Some embodiments can also use TDHM for each of shaping encoders DM1 and DM2 to implement a more complicated TDHM scheme.

Example 2

Figure 10:
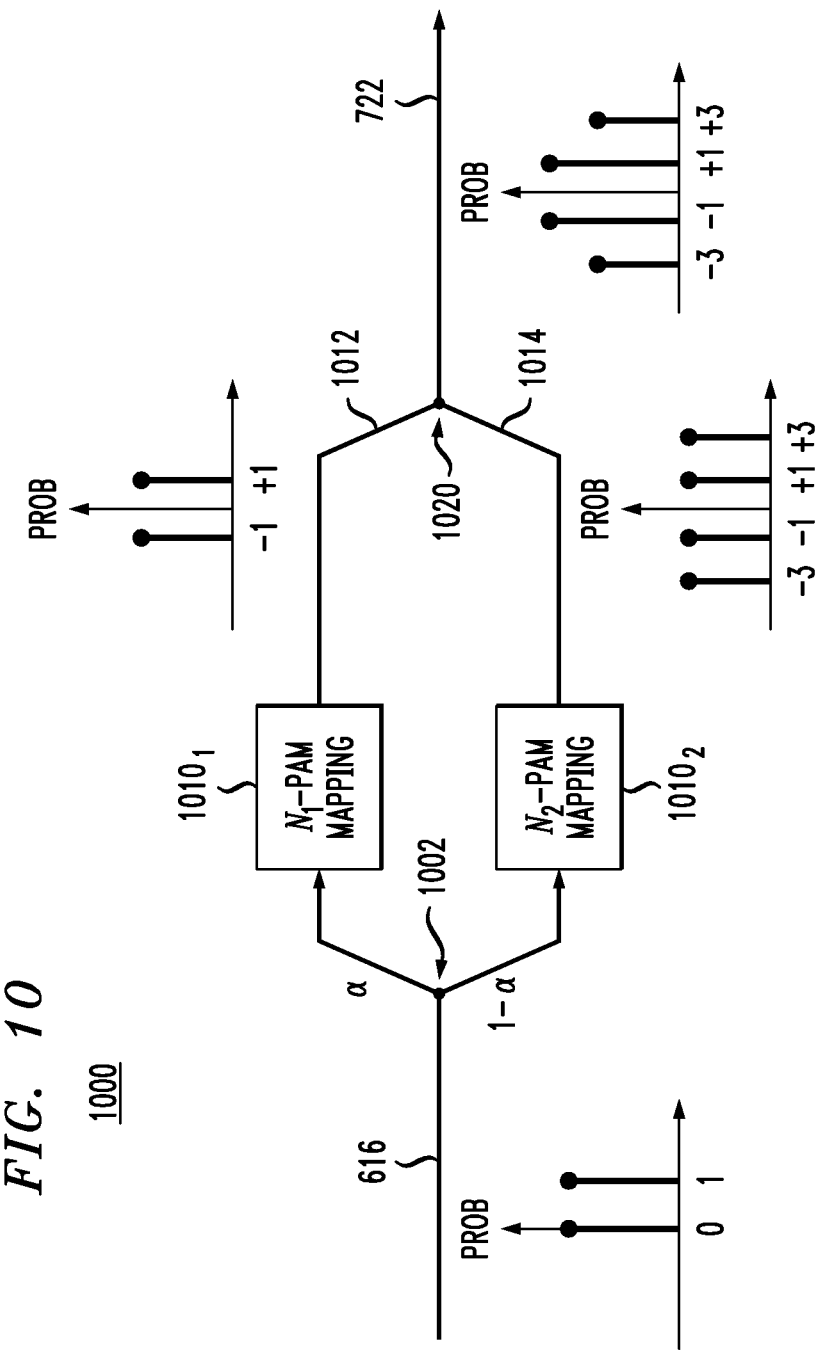
FIG. 10 shows a block diagram of a shaping encoder that can be used in the electronic encoder of FIG. 7 according to an embodiment.
Figure 11:
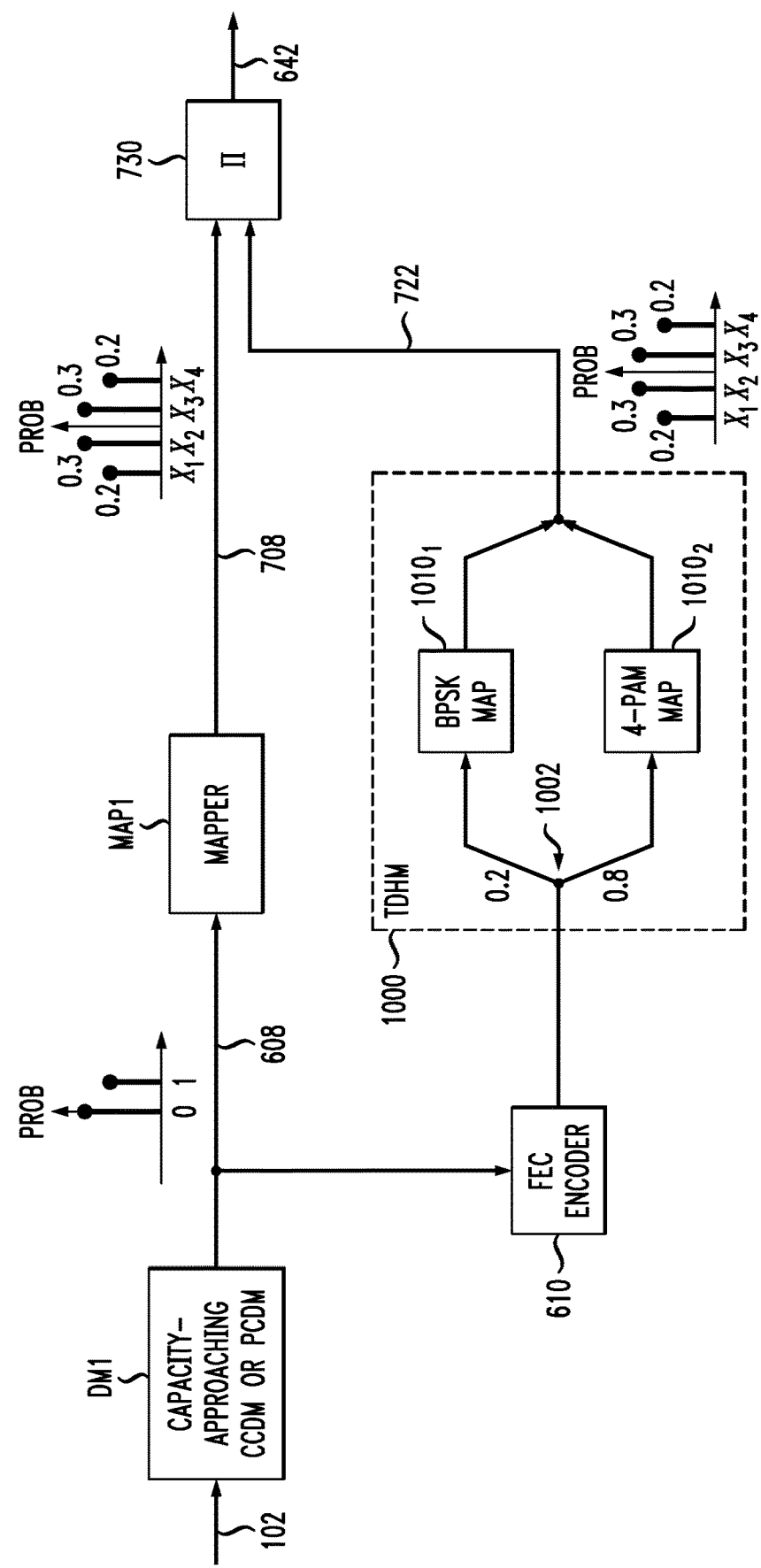
FIG. 11 shows a block diagram of an electronic encoder according to an example embodiment in which the circuit of FIG. 10 can be used.

An arbitrary shaping encoder DM1 is used in conjunction with a TDHM-implemented shaping encoder DM2, an example embodiment of which is described in reference to FIGS. 10-11.

FIG. 10 shows a block diagram of a digital circuit 1000 that can be used to implement shaping encoder DM2 and constellation mapper MAP2 (FIG. 7) according to an example embodiment. The graph inserts in FIG. 10 graphically show example probability distributions corresponding to some data streams in circuit 1000 according to an example embodiment. Labels 616 and 722 in FIG. 10 indicate the relationship between the circuits shown in FIGS. 7 and 10.

Circuit 1000 comprises constellation mappers $1010_1$ and $1010_2$. Constellation mapper $1010_1$ is configured to use an $N_1$-PAM constellation. Constellation mapper $1010_2$ is configured to use an $N_2$-PAM constellation, where $N_1 \neq N_2$. The graph inserts in FIG. 10 correspond to an embodiment in which $N_1=2$ and $N_2=4$.

Circuit 1000 further comprises a 1×2 switch 1002 that operates to direct the bits of stream 616 to: (i) constellation mapper $1010_1$ a fraction a of the time; and (ii) constellation mapper $1010_2$ the rest (i.e., 1-α) of the time. Constellation mapper $1010_1$ uses the received bits to generate a corresponding constellation-symbol stream 1012. Constellation mapper $1010_2$ similarly uses the received bits to generate a corresponding constellation-symbol stream 1014.

Circuit 1000 further comprises a multiplexing circuit 1020 that operates to multiplex constellation-symbol streams 1012 and 1014, thereby generating constellation-symbol stream 722.

The graph inserts in FIG. 10 graphically show the probability distributions corresponding to streams 616, 1012, 1014, and 722. The following characteristics of these streams are indicated in the shown graphs. Data stream 616 has equal probabilities of occurrence for the "0" and "1" bits therein. Constellation-symbol stream 1012 has equal probabilities of occurrence for the (two in this example) constellation symbols of the $N_1$-PAM constellation therein. Constellation-symbol stream 1014 has equal probabilities of occurrence for the (four in this example) constellation symbols of the $N_2$-PAM constellation therein. The $N_1$-PAM constellation and the $N_2$-PAM constellation have some (e.g., two in this example) constellation symbols in common. Constellation-symbol stream 722 can be viewed as carrying the constellation symbols of the $N_2$-PAM constellation. However, in contrast to constellation-symbol stream 1014, constellation-symbol stream 722 is probabilistically shaped because the constellation symbols that are common to the two constellations occur therein more frequently than those constellation symbols which are only present in the $N_2$-PAM constellation.

FIG. 11 shows a block diagram of encoder 110 according to an example embodiment in which circuit 1000 of FIG. 10 can be used. The graph inserts in FIG. 11 graphically show example probability distributions corresponding to some data streams in this embodiment of encoder 110.

In this embodiment, shaping encoder DM1 is configured to use capacity approaching CCDM or PCDM. Constellation mapper $1010_1$ is configured to use a binary phase-shift keying (BPSK) constellation (also sometimes referred to as 2-PAM; i.e., $N_1=2$). Constellation mapper $1010_2$ is configured to use a 4-PAM constellation (i.e., $N_2=4$). Switch 1002 is switched using the time fraction value α=0.2. The graph inserts in FIG. 11 graphically show the probability distributions corresponding to streams 608, 708, and 722, with the probability values explicitly shown in some of the graphs. Note that, in this particular embodiment, streams 708 and 722 have identical probability distribution. A person of ordinary skill in the art will understand that, in alternative embodiments, streams 708 and 722 have different respective probability distributions.

For example, the encoder architecture shown in FIG. 3 and implemented with a rate-$R_c$ FEC code can carry $H(X)-(1-R_c) \times m$ information bits per symbol, where $H(X)$ is the entropy of the PAM symbol distribution and m is the number of bits/symbol of the underlying uniform PAM template; i.e., $(1-R_c) \times m$ bits per symbol are spent on the FEC overhead. For comparison, if the PCS architecture of FIG. 7 is used to produce the same symbol distribution, with shaping encoder DM2 being implemented using TDHM as indicated in FIG. 11, each transmitted symbol can carry $H(X)R_c/[R_c+(1-R_c)\times m/R_{DM2}]$ information bits per symbol, where $R_{DM2}$ denotes the number of bits/symbol encoded by shaping encoder DM2 (e.g., TDHM, FIG. 11). The latter scheme can be referred to as the PCS-TDHM scheme.

Figure 12:
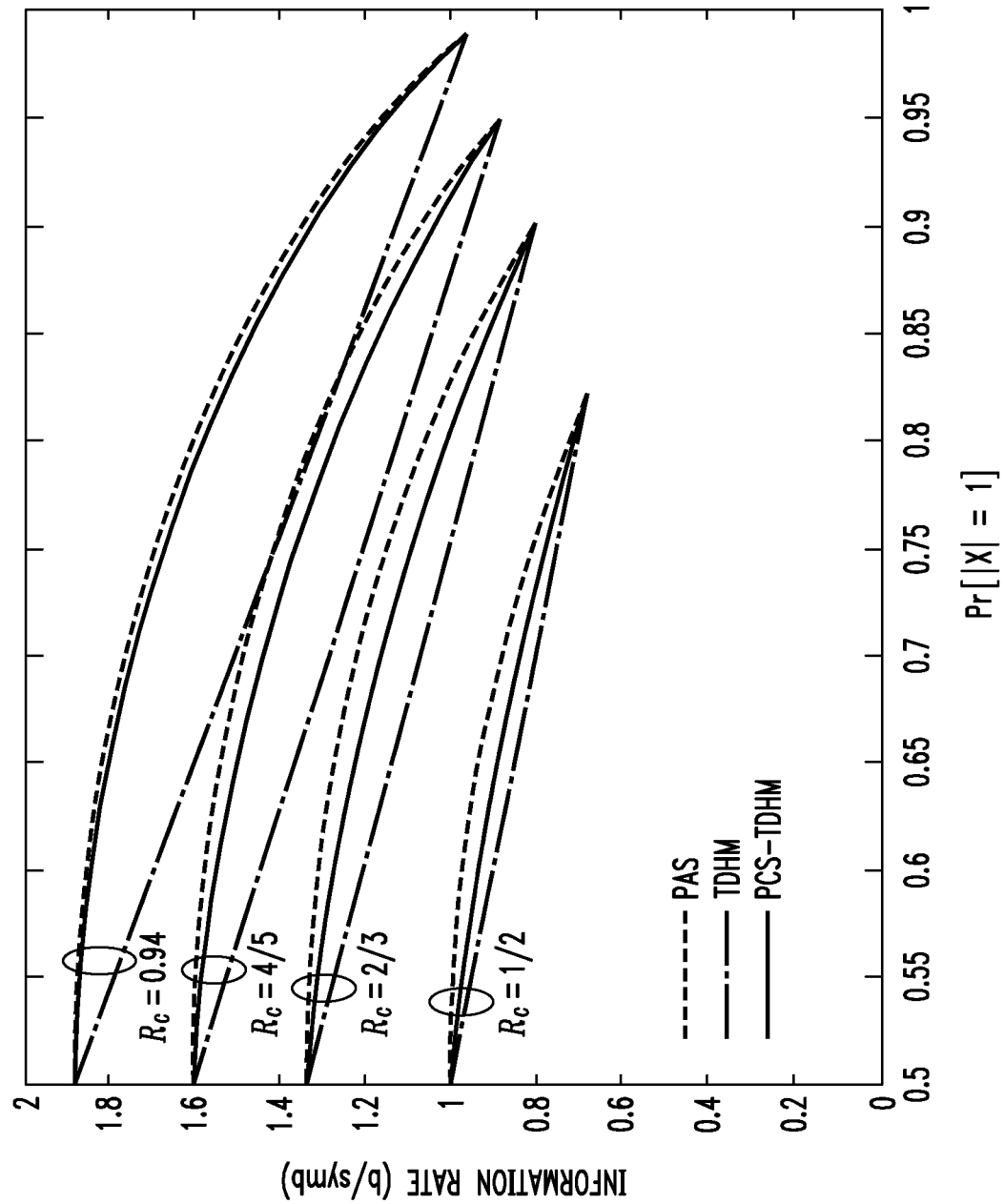
FIG. 12 graphically compares information rates in terms of the number of information bits per transmitted symbol for some example encoding schemes.

FIG. 12 graphically shows information rates in terms of the number of information bits per transmitted symbol for three different PCS schemes (namely, the PAS, PCS-TDHM, and the conventional TDHM schemes), using a 4-PAM constellation template −3,−1,+1,+3, and assuming symmetric probability distributions around zero. The results shown in FIG. 12 indicate that the performance of the PCS-TDHM scheme is comparable to that of the PAS scheme.

Example 3

Shaping encoder DM2 is configured to use of fixed-to-fixed (F2F) encoding.

Figures 13A, 13B:
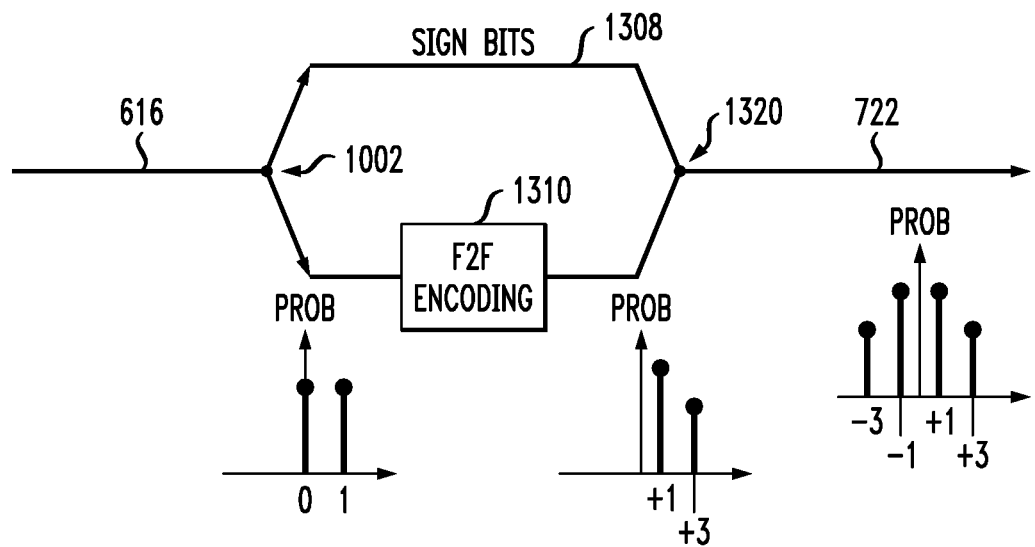
FIGS. 13A-13B illustrate a shaping encoder that can be used in the electronic encoder of FIG. 7 according to an alternative embodiment.

FIGS. 13A-13B illustrate circuit 1000 according to alternative embodiment. More specifically, FIG. 13A shows a block diagram of this embodiment of circuit 1000. FIG. 13B shows an example mapping table that can be used in the circuit 1000 of FIG. 13A. The graph inserts in FIG. 13A graphically show example probability distributions corresponding to some data streams in this embodiment of circuit 1000. Labels 616 and 722 in FIG. 10 indicate the relationship between the circuits shown in FIGS. 7 and 13A.

In this embodiment, circuit 1000 comprises switch 1002, an F2F mapper 1310, and a concatenator 1320.

From the inspection of FIG. 13B, one can note that that F2F mapper 1310 produces a fixed-length (3-bit) output from a fixed-length (2-bit) input. Here, for the input sequence of "10", the F2F mapper produces either "010" or "100" at random, with equal or unequal probabilities. Note that, although this mapping is a one-to-many mapping, the recovered error-free 3-bit sequences at the receiver can uniquely be decoded back to the original 2-bit input sequences, thereby allowing substantially lossless recovery of the information.

Concatenator 1320 operates to prepend to the positive amplitude values generated by F2F mapper 1310, as sign bits, the bits directed by switch 1002 to the concatenator through a path 1308.

Circuit 1000 implemented using the F2F encoding table of FIG. 13B produces 1.67 b/symbol in the architecture of FIG. 13A. For comparison, circuit 1000 of FIG. 10 configured to generate the same symbol distribution in stream 722 produces 1.5 b/symbol.

Figure 14:
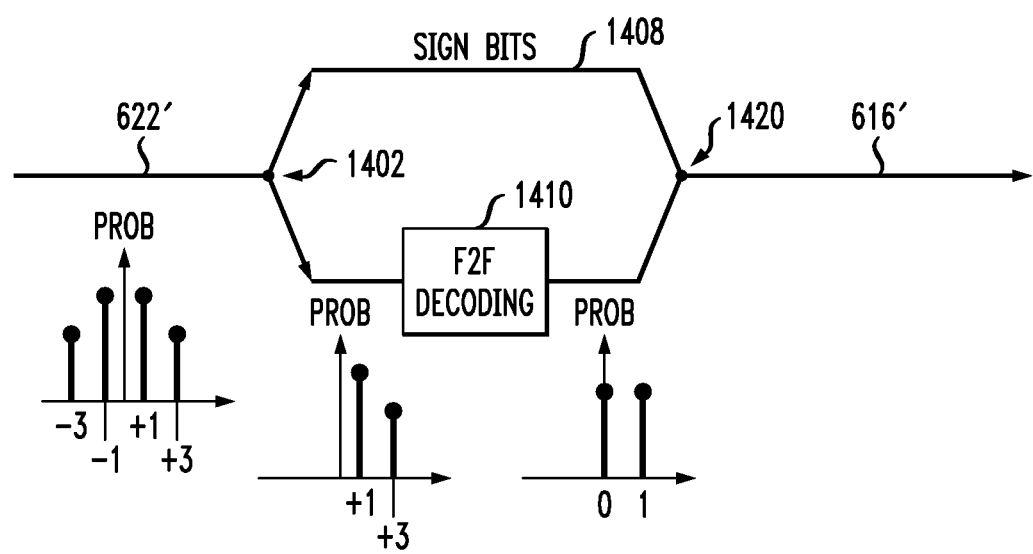
FIG. 14 shows a block diagram of shaping decoder that can be used in the electronic decoder of FIG. 8 or 9 according to an embodiment.

FIG. 14 shows a block diagram of shaping decoder $820_2$ according to an embodiment. This embodiment of shaping decoder $820_2$ is compatible with the embodiment of circuit 1000 shown in FIG. 13A. The graph inserts in FIG. 14 graphically show example probability distributions corresponding to some data streams in shaping decoder $820_2$. Labels 622' and 616' in FIG. 14 indicate the relationship between the circuits shown in FIGS. 8/9 and 14.

In the embodiment of FIG. 14, shaping decoder $820_2$ comprises a parser 1402, an F2F decoder 1410, and a multiplexer 1420.

Parser 1402 operates to parse each signed amplitude value provided by stream 622' into a respective sign bit and a respective positive amplitude value. The resulting stream of sign bits is directed via a path 1408. The resulting stream of positive amplitude values is directed to F2F decoder 1410.

F2F decoder 1410 operates in accordance with the mapping table of FIG. 13B to convert the positive amplitudes into corresponding bit-words.

Multiplexer 1420 operates to appropriately multiplex the data stream outputted by F2F decoder 1410 and the stream of sign bits received via path 1408, thereby generating data stream 622'.

Figure 15:
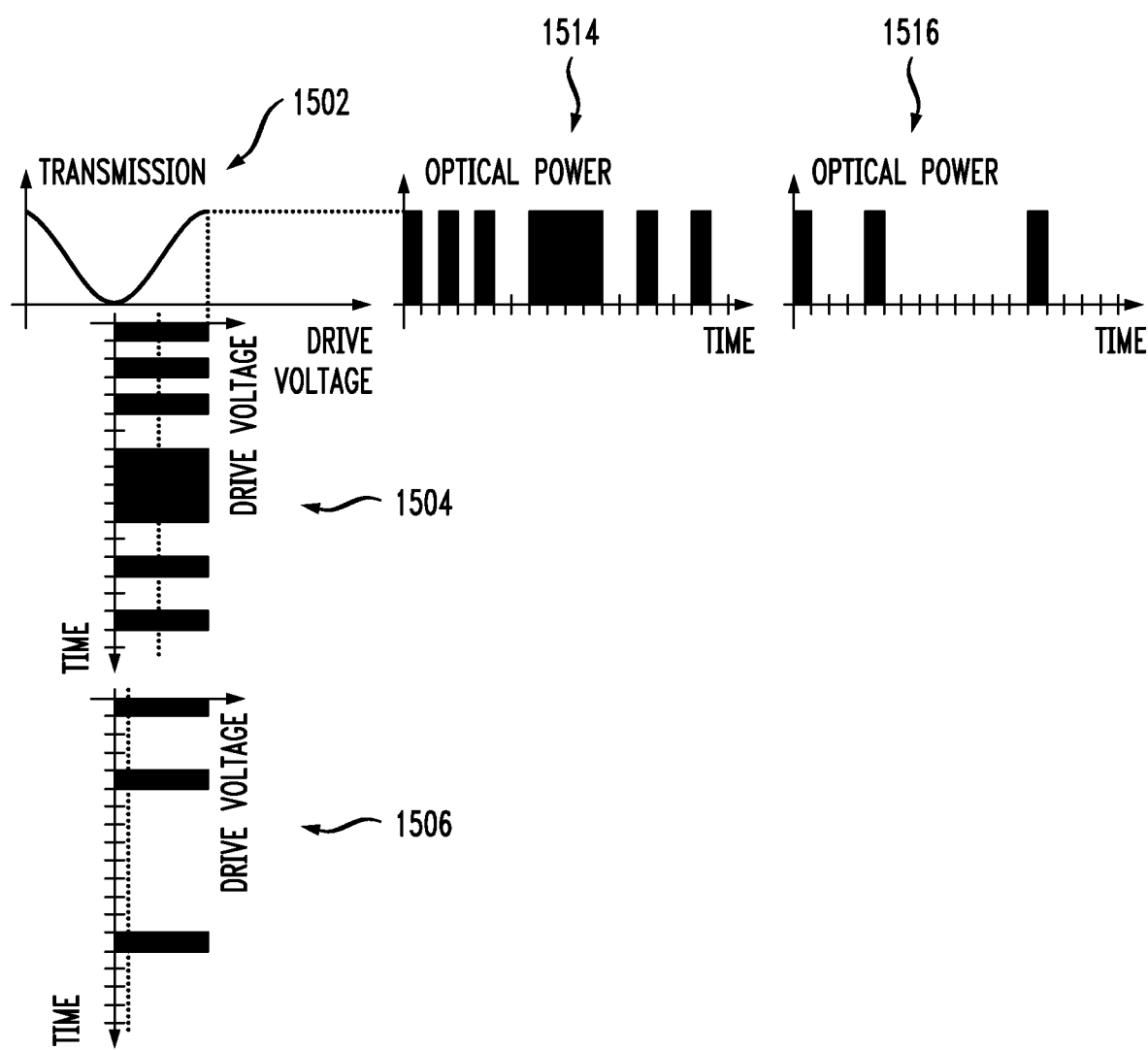
FIGS. 15-16 graphically illustrate example technical approaches that can be used to design an electrical-to-optical (E/O) converter for the communication system of FIG. 1 according to some example embodiments.
Figure 16:
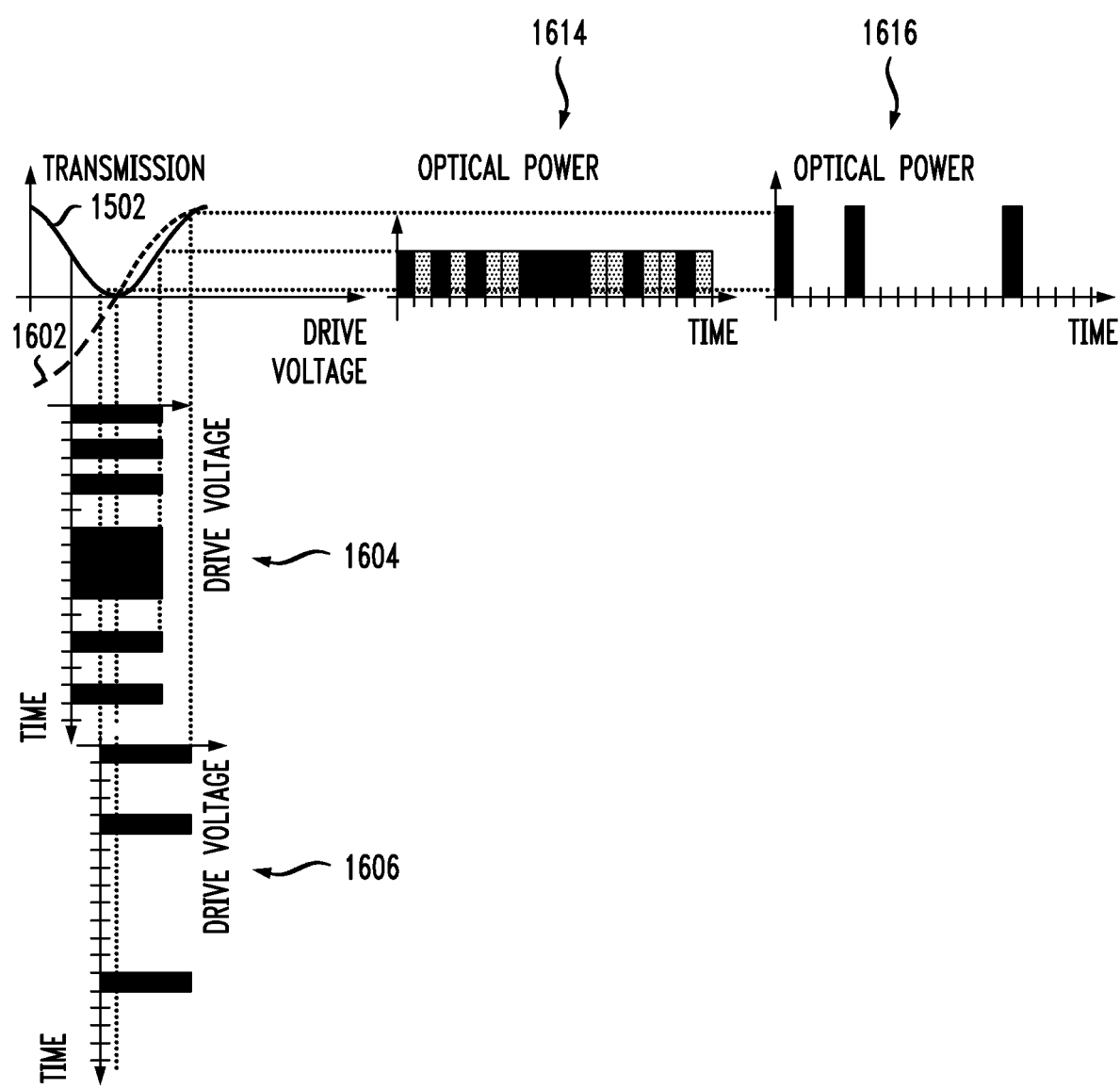

FIGS. 15-16 and the associated discussion below touch upon technical approaches that can be used to design E/O converter 140 (FIG. 1) according to some example embodiments.

In order to optically modulate the G-OOK format in the most energy-efficient manner, a laser can be biased around the threshold representing the "0" bit. Each "1" bit drives the laser into its lasing regime, thus causing the laser to emit coherent light.

A similar setup can be used with an external absorption modulator to create "0" and "1" bits from a continuous laser source.

As a third alternative, an interference-based modulator, such as a ring resonator or a Mach-Zehnder modulator, may be used and switched between suitably chosen extinction and transmission points.

FIG. 15 visualizes the modulator driver configuration for the case of a Mach-Zehnder modulator as an example. The graph in the upper left corner of FIG. 15 shows the modulator transfer function 1502. Graphs 1504 and 1506 show example drive signals. Graphs 1514 and 1516 show the corresponding optical waveforms.

For DC-coupled modulator drive electronics, the bias of the modulator remains at a fixed level, as the voltages corresponding to the "0" and "1" bits are defined by the electronics, independent of the mark ratio $p_1$.

For AC-coupled modulator drive electronics, however, the average drive voltage can drop with the reduced mark ratio, e.g., as indicated by the dashed lines in graph 1506, as compared to the dashed line in graph 1504. This drop needs to be corrected by a bias control circuit configured to dynamically adjust the bias level in accordance with the mark ratio $p_1$.

In order to optically modulate the formats of FIGS. 5A-5B, a Mach-Zehnder modulator needs to be configured to generate both positive and negative optical field amplitudes. A suitable modulator configuration is indicated in FIG. 16. The graph in the upper left corner of FIG. 16 shows the modulator transfer function 1602, with the modulator transfer function 1502 of FIG. 15 also shown for comparison.

If drive signal 1506 is applied to the modulator having transfer function 1602, then the resulting optical output, shown in graph 1616, is not satisfactory. This problem can be addressed using the AC-coupled drive electronics that automatically balances negative-amplitude and positive-amplitude signals according to $p_0X_0+p_1X_1=0$, e.g., as indicated by the graph 1604. The resulting optical output, shown in graph 1614, has equal power for negative-amplitude and positive-amplitude signals, which is a preferred outcome.

Transfer function 1602 and graphs 1604 and 1614 represent a preferred embodiment, as it allows maintaining an optimum modulator bias even for dynamically changing mark ratios. However, to ensure proper AC coupling, the lower cut-off frequency of the drive electronics has to be significantly below the lowest frequency components of the drive signal, i.e., too long a run of "1" bits or "0" bits needs to be avoided, which can be ensured through proper coding in the corresponding shaping encoder. The PPM portion of the coded signal automatically introduces one pulse every k bits. To generate PS-4-AQAM, two appropriately driven Mach-Zehnder modulators can be nested, e.g., in a conventional I/Q-modulator structure.

FIG. 17 shows a block diagram of optical transmitter 104 that can be used in system 100 (FIG. 1) according to an embodiment.

In operation, transmitter 104 receives input stream 102 of payload data and applies it to a digital signal processor (DSP) 112, which implements, inter alia, the electronic encoder 110 (FIG. 1). DSP 112 processes input data stream 102 to generate digital signals $114_1$-$114_4$. In an example embodiment, DSP 112 may perform, one or more of the following: (i) de-multiplex input stream 102 into two sub-streams, each intended for optical transmission using a respective one of orthogonal (e.g., X and Y) polarizations of optical output signal 142; (ii) encode each of the sub-streams using a suitable code, e.g., as outlined above; and (iii) convert each of the two resulting sub-streams into a corresponding sequence of constellation symbols. In each signaling interval (also referred to as a symbol period or time slot), signals $114_1$ and $114_2$ carry digital values that represent the in-phase (I) component and quadrature (Q) component, respectively, of a corresponding constellation symbol intended for transmission using a first (e.g., X) polarization of light. Signals $114_3$ and $114_4$ similarly carry digital values that represent the I and Q components, respectively, of the corresponding constellation symbol intended for transmission using a second (e.g., Y) polarization of light.

E/O converter 140 operates to transform digital signals $114_1$-$114_4$ into a corresponding modulated optical output signal 142. More specifically, drive circuits $118_1$ and $118_2$ transform digital signals $114_1$ and $114_2$, as known in the art, into electrical analog drive signals $I_X$ and $Q_X$, respectively. Drive signals $I_X$ and $Q_X$ are then used, in a conventional manner, to drive an I-Q modulator $124_X$. In response to drive signals $I_X$ and $Q_X$, I-Q modulator $124_X$ operates to modulate an X-polarized beam $122_X$ of light supplied by a laser source 120 as indicated in FIG. 17, thereby generating a modulated optical signal $126_X$.

Drive circuits $118_3$ and $118_4$ similarly transform digital signals $114_3$ and $114_4$ into electrical analog drive signals $I_Y$ and $Q_Y$, respectively. In response to drive signals $I_Y$ and $Q_Y$, an I-Q modulator $124_Y$ operates to modulate a Y-polarized beam $122_Y$ of light supplied by laser source 120 as indicated in FIG. 17, thereby generating a modulated optical signal $126_Y$. A polarization beam combiner 128 operates to combine modulated optical signals $126_X$ and $126_Y$, thereby generating optical output signal 142 (also see FIG. 1).

FIG. 18 shows a block diagram of optical receiver 108 that can be used in system 100 (FIG. 1) according to an embodiment.

O/E converter 150 comprises an optical hybrid 159, light detectors $161_1$-$161_4$, analog-to-digital converters (ADCs) $166_1$-$166_4$, and an optical local-oscillator (OLO) source 156. Optical hybrid 159 has (i) two input ports labeled S and R and (ii) four output ports labeled 1 through 4. Input port S receives optical signal 142' (also see FIG. 1). Input port R receives an OLO signal 158 generated by OLO source 156. OLO signal 158 has an optical-carrier wavelength (frequency) that is sufficiently close to that of signal 142' to enable coherent (e.g., intradyne) detection of the latter signal. OLO signal 158 can be generated, e.g., using a relatively stable laser whose output wavelength (frequency) is approximately the same as the carrier wavelength (frequency) of optical signal 142.

In an example embodiment, optical hybrid 159 operates to mix input signal 142' and OLO signal 158 to generate different mixed (e.g., by interference) optical signals (not explicitly shown in FIG. 18). Light detectors $161_1$-$161_4$ then convert the mixed optical signals into four electrical signals $162_1$-$162_4$ that are indicative of complex values corresponding to two orthogonal-polarization components of signal 142'. For example, electrical signals $162_1$ and $162_2$ may be an analog I signal and an analog Q signal, respectively, corresponding to a first (e.g., horizontal, h) polarization component of signal 142'. Electrical signals $162_3$ and $162_4$ may similarly be an analog I signal and an analog Q signal, respectively, corresponding to a second (e.g., vertical, v) polarization component of signal 142'. Note that the orientation of the h and v polarization axes at receiver 108 may not coincide with the orientation of the X and Y polarization axes at transmitter 104.

Each of electrical signals $162_1$-$162_4$ is converted into digital form in a corresponding one of ADCs $166_1$-$166_4$. Optionally, each of electrical signals $162_1$-$162_4$ may be amplified in a corresponding electrical amplifier (not explicitly shown) prior to the resulting signal being converted into digital form. Digital signals $168_1$-$168_4$ produced by ADCs $166_1$-$166_4$ are then processed by a DSP 170, which implements, inter alia, electronic decoder 160 (see FIG. 1).

In an example embodiment, in addition to the above-described decoding, DSP 170 may perform one or more of the following: (i) signal processing directed at dispersion compensation; (ii) signal processing directed at compensation of nonlinear distortions; and (iii) electronic polarization de-multiplexing.

According to an example embodiment disclosed above, e.g., in the summary section and/or in reference to any one or any combination of some or all of FIGS. 1-18, provided is an apparatus comprising: an optical data transmitter (e.g., 104, FIG. 1) that comprises an optical front end (e.g., 140, FIG. 1; 112, FIG. 17) and a digital signal processor (e.g., 110, FIG. 1), the digital signal processor being configured to: redundancy-encode an input data stream (e.g., 102, FIGS. 1, 6, 7) to generate a constellation-symbol stream (e.g., 138, FIGS. 1, 6, 7); and drive the optical front end to cause a modulated carrier wavelength generated by the optical front end to carry the constellation-symbol stream; and wherein the digital signal processor comprises: a first shaping encoder (e.g., DM1, FIGS. 6, 7, 11) configured to generate a first bit-word stream (e.g., 608, FIGS. 6, 7, 11) by encoding the input data stream; an FEC encoder (e.g., 610, FIGS. 6, 7, 11) configured to generate a parity data stream by encoding the first bit-word stream using an FEC code; a second shaping encoder (e.g., DM2, FIGS. 6, 7) configured to generate a second bit-word stream (e.g., 622, FIGS. 6, 7, 11) by encoding the parity data stream; and a multiplexing circuit (e.g., 630/640, FIG. 6; MAP1/MAP2/730, FIG. 7)

configured to generate the constellation-symbol stream in response to the first and second bit-word streams.

In some embodiments of the above apparatus, the multiplexing circuit is configured to generate the constellation-symbol stream in which constellation symbols generated by constellation mapping bit-words of the first bit-word stream are time-division-multiplexed with constellation symbols generated by constellation mapping bit-words of the second bit-word stream.

In some embodiments of any of the above apparatus, the first and second shaping encoders and the multiplexing circuit are configured to cause the digital signal processor to generate the constellation-symbol stream having constellation symbols of a first transmit energy and constellation symbols of a second transmit energy that is greater than the first transmit energy such that the constellation symbols of the second transmit energy occur with lower probability than the constellation symbols of the first transmit energy.

In some embodiments of any of the above apparatus, the multiplexing circuit comprises a data interleaver (e.g., 630, FIG. 6) configured to interleave bit-words of the first bit-word stream with bit-words of the second bit-word stream.

In some embodiments of any of the above apparatus, the multiplexing circuit comprises: a first constellation mapper (e.g., MAP1, FIG. 7) configured to convert each bit-word of the first bit-word stream into a corresponding constellation symbol of a first constellation; a second constellation mapper (e.g., MAP2, FIG. 7) configured to convert each bit-word of the second bit-word stream into a corresponding constellation symbol of a second constellation; and a symbol interleaver (e.g., 730, FIG. 7) configured to generate the constellation-symbol stream by interleaving constellation symbols of the first and second constellations received from the first and second constellation mappers.

In some embodiments of any of the above apparatus, the first and second constellations have different respective numbers of constellation symbols.

In some embodiments of any of the above apparatus, the first constellation includes one or more constellation symbols of a first transmit energy and one or more constellation symbols of a second transmit energy that is greater than the first transmit energy; and wherein the first shaping encoder is configured to generate the first bit-word stream in a manner that causes the first constellation mapper to output constellation symbols of the second transmit energy with lower probability than constellation symbols of the first transmit energy.

In some embodiments of any of the above apparatus, the second constellation includes one or more constellation symbols of a first transmit energy and one or more constellation symbols of a second transmit energy that is greater than the first transmit energy; and wherein the second shaping encoder is configured to generate the second bit-word stream in a manner that causes the second constellation mapper to output constellation symbols of the second transmit energy with lower probability than constellation symbols of the first transmit energy.

In some embodiments of any of the above apparatus, at least one of the first and second constellations is a constellation (e.g., 404, FIG. 4B; 502, FIG. 5A; 504, FIG. 5B) that is asymmetric with respect to zero.

In some embodiments of any of the above apparatus, at least one of the first and second constellations is a constellation (e.g., 402, FIG. 4A) that includes a constellation symbol of zero amplitude.

In some embodiments of any of the above apparatus, the first shaping encoder is configured to generate the first bit-word stream using a first shaping code; and wherein the second shaping encoder is configured to generate the second bit-word stream using a second shaping code that is different from the first shaping code.

In some embodiments of any of the above apparatus, the first and second bit-word streams have different respective bit rates.

In some embodiments of any of the above apparatus, the first and second bit-word streams have different respective bit-word rates.

In some embodiments of any of the above apparatus, the apparatus further comprises an optical data receiver (e.g., 108, FIG. 1) configured to receive the modulated carrier wavelength, the optical data receiver including a digital signal processor (e.g., 160, FIGS. 1, 8, 9; 170, FIG. 18) configured to recover the input data stream in response to the modulated carrier wavelength being received by the optical data receiver.

In some embodiments of any of the above apparatus, the second shaping encoder comprises a switch (e.g., 1002, FIG. 10) having (i) an input configured to receive the parity data stream and (ii) first and second outputs, the switch being configured to connect either the first output or the second output to the input for different respective fractions (e.g., $\alpha$ and $(1-\alpha)$, FIG. 10) of time.

In some embodiments of any of the above apparatus, the apparatus further comprises a first constellation mapper (e.g., 1010$_1$, FIG. 10) connected to receive data from the first output of the switch; and a second constellation mapper (e.g., 1010$_2$, FIG. 10) connected to receive data from the second output of the switch; and wherein the multiplexing circuit (e.g., including 1020, FIG. 10) is configured to generate the constellation-symbol stream in which constellation symbols generated by the first constellation mapper are time-division-multiplexed with constellation symbols generated by the second constellation mapper.

In some embodiments of any of the above apparatus, the first constellation mapper is configured to use a first constellation; wherein the second constellation mapper is configured to use a second constellation; and wherein the first and second constellations have different respective numbers of constellation symbols (e.g., as indicated by the graph inserts in FIG. 10).

In some embodiments of any of the above apparatus, the optical front end comprises an optical IQ modulator (e.g., 124, FIG. 17) with dynamic bias control configured to equalize an optical power corresponding to negative-amplitude and positive-amplitude constellation symbols.

In some embodiments of any of the above apparatus, the dynamic bias control is implemented using an AC-coupled circuit configured to equalize the optical power based on relative probabilities of occurrence of the negative-amplitude and positive-amplitude constellation symbols (e.g., in accordance with $p_0X_0+p_1X_1=0$, and/or as indicated by 1604/1614, FIG. 16).

According to another example embodiment disclosed above, e.g., in the summary section and/or in reference to any one or any combination of some or all of FIGS. 1-18, provided is a communication method comprising the steps of: configuring a digital signal processor (e.g., 110, FIG. 1) to perform redundancy-encoding of an input data stream (e.g., 102, FIGS. 1, 6, 7) to generate a constellation-symbol stream (e.g., 138, FIGS. 1, 6, 7); and configuring the digital signal processor to generate an electrical output signal (e.g., 138, FIG. 1) suitable for driving an optical front end (e.g., 140, FIG. 1) of an optical data transmitter (e.g., 104, FIG. 1) in a manner that causes a modulated carrier wavelength generated by the optical front end to carry the constellation-symbol stream; and wherein said redundancy-encoding comprises: generating a first bit-word stream (e.g., 608, FIGS. 6, 7, 11) by encoding the input data stream using a first shaping encoder (e.g., DM1, FIGS. 6, 7, 11); generating a parity data stream by encoding the first bit-word stream using an FEC encoder (e.g., 610, FIGS. 6, 7, 11); generating a second bit-word stream (e.g., 622, FIGS. 6, 7, 11) by encoding the parity data stream using a second shaping encoder (e.g., DM2, FIGS. 6, 7, 11); and generating the constellation-symbol stream in response to the first and second bit-word streams using a multiplexing circuit (e.g., 630/640, FIG. 6; MAP1/MAP2/730, FIGS. 7, 11).

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Some embodiments may be implemented as circuit-based processes, including possible implementation on a single integrated circuit.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term compatible means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they formally fall within the scope of the claims.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The description and drawings merely illustrate the principles of the disclosure. It will thus be appreciated that those of ordinary skill in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

The functions of the various elements shown in the figures, including any functional blocks labeled or referred to as "processors" and/or "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

As used in this application, the term "circuitry" may refer to one or more or all of the following: (a) hardware-only circuit implementations (such as implementations in only analog and/or digital circuitry); (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It should be appreciated by those of ordinary skill in the art that any block diagrams herein represent conceptual views of illustrative circuitry embodying the principles of the disclosure.

What is claimed is:

1. An apparatus comprising an optical data transmitter that comprises an optical front end and a digital signal processor, the digital signal processor being configured to:
   redundancy-encode an input data stream to generate a constellation-symbol stream; and
   drive the optical front end to cause a modulated carrier wavelength generated by the optical front end to carry the constellation-symbol stream;
   wherein the digital signal processor comprises:
      a first shaping encoder configured to generate a first bit-word stream by encoding the input data stream;
      an FEC encoder configured to generate a parity data stream by encoding the first bit-word stream using an FEC code;
      a second shaping encoder configured to generate a second bit-word stream by encoding the parity data stream; and
      a multiplexing circuit configured to generate the constellation-symbol stream in response to the first and second bit-word streams; and
   wherein the first and second shaping encoders and the multiplexing circuit are configured to cause the digital signal processor to generate the constellation-symbol stream having constellation symbols of a first transmit energy and constellation symbols of a second transmit energy that is greater than the first transmit energy such that the constellation symbols of the second transmit energy occur with lower probability than the constellation symbols of the first transmit energy.

2. The apparatus of claim 1, wherein the multiplexing circuit is configured to generate the constellation-symbol stream in which constellation symbols generated by constellation mapping bit-words of the first bit-word stream are time-division-multiplexed with constellation symbols generated by constellation mapping bit-words of the second bit-word stream.

3. The apparatus of claim 1, wherein the multiplexing circuit comprises a data interleaver configured to interleave bit-words of the first bit-word stream with bit-words of the second bit-word stream.

4. The apparatus of claim 1, wherein the multiplexing circuit comprises:
   a first constellation mapper configured to convert each bit-word of the first bit-word stream into a corresponding constellation symbol of a first constellation;
   a second constellation mapper configured to convert each bit-word of the second bit-word stream into a corresponding constellation symbol of a second constellation; and
   a symbol interleaver configured to generate the constellation-symbol stream by interleaving constellation symbols of the first and second constellations received from the first and second constellation mappers.

5. The apparatus of claim 4, wherein the first and second constellations have different respective numbers of constellation symbols.

6. The apparatus of claim 4,
   wherein the first shaping encoder is configured to generate the first bit-word stream in a manner that causes the first constellation mapper to output constellation symbols of the second transmit energy with lower probability than constellation symbols of the first transmit energy.

7. The apparatus of claim 4,
   wherein the second shaping encoder is configured to generate the second bit-word stream in a manner that causes the second constellation mapper to output constellation symbols of the second transmit energy with lower probability than constellation symbols of the first transmit energy.

8. The apparatus of claim 4, wherein at least one of the first and second constellations is a constellation that is asymmetric with respect to zero.

9. The apparatus of claim 4, wherein at least one of the first and second constellations is a constellation that includes a constellation symbol of zero amplitude.

10. The apparatus of claim 1,
    wherein the first shaping encoder is configured to generate the first bit-word stream using a first shaping code; and
    wherein the second shaping encoder is configured to generate the second bit-word stream using a second shaping code that is different from the first shaping code.

11. The apparatus of claim 1, wherein the first and second bit-word streams have different respective bit rates.

12. The apparatus of claim 1, wherein the first and second bit-word streams have different respective bit-word rates.

13. The apparatus of claim 1, further comprising an optical data receiver configured to receive the modulated carrier wavelength, the optical data receiver including a digital signal processor configured to recover the input data stream in response to the modulated carrier wavelength being received by the optical data receiver.

14. The apparatus of claim 1, wherein the second shaping encoder comprises a switch having (i) an input configured to receive the parity data stream and (ii) first and second outputs, the switch being configured to connect either the first output or the second output to the input for different respective fractions of time.

15. The apparatus of claim 14, further comprising:
    a first constellation mapper connected to receive data from the first output of the switch; and
    a second constellation mapper connected to receive data from the second output of the switch; and wherein the multiplexing circuit is configured to generate the constellation-symbol stream in which constellation symbols generated by the first constellation mapper are time-division-multiplexed with constellation symbols generated by the second constellation mapper.

16. The apparatus of claim 15,
wherein the first constellation mapper is configured to use a first constellation;
wherein the second constellation mapper is configured to use a second constellation; and
wherein the first and second constellations have different respective numbers of constellation symbols.

17. The apparatus of claim 1, wherein the optical front end comprises an optical IQ modulator with dynamic bias control configured to equalize an optical power corresponding to negative-amplitude and positive-amplitude constellation symbols.

18. The apparatus of claim 17, wherein the dynamic bias control is implemented using an AC-coupled circuit configured to equalize the optical power based on relative probabilities of occurrence of the negative-amplitude and positive-amplitude constellation symbols.

19. A communication method, comprising:
configuring a digital signal processor to perform redundancy-encoding of an input data stream to generate a constellation-symbol stream; and
configuring the digital signal processor to generate an electrical output signal suitable for driving an optical front end of an optical data transmitter in a manner that causes a modulated carrier wavelength generated by the optical front end to carry the constellation-symbol stream;
wherein said redundancy-encoding comprises:
generating a first bit-word stream by encoding the input data stream using a first shaping encoder;
generating a parity data stream by encoding the first bit-word stream using an FEC encoder;
generating a second bit-word stream by encoding the parity data stream using a second shaping encoder; and
generating the constellation-symbol stream in response to the first and second bit-word streams using a multiplexing circuit; and
wherein the first and second shaping encoders and the multiplexing circuit are configured to cause the digital signal processor to generate the constellation-symbol stream having constellation symbols of a first transmit energy and constellation symbols of a second transmit energy that is greater than the first transmit energy such that the constellation symbols of the second transmit energy occur with lower probability than the constellation symbols of the first transmit energy.

20. An apparatus comprising an optical data transmitter that comprises an optical front end and a digital signal processor, the digital signal processor being configured to:
redundancy-encode an input data stream to generate a constellation-symbol stream; and
drive the optical front end to cause a modulated carrier wavelength generated by the optical front end to carry the constellation-symbol stream;
wherein the digital signal processor comprises:
a first shaping encoder configured to generate a first bit-word stream by encoding the input data stream;
an FEC encoder configured to generate a parity data stream by encoding the first bit-word stream using an FEC code;
a second shaping encoder configured to generate a second bit-word stream by encoding the parity data stream; and
a multiplexing circuit configured to generate the constellation-symbol stream in response to the first and second bit-word streams; and
wherein the second shaping encoder comprises a switch having (i) an input configured to receive the parity data stream and (ii) first and second outputs, the switch being configured to connect either the first output or the second output to the input for different respective fractions of time.

21. The apparatus of claim 20, further comprising:
a first constellation mapper connected to receive data from the first output of the switch; and
a second constellation mapper connected to receive data from the second output of the switch; and
wherein the multiplexing circuit is configured to generate the constellation-symbol stream in which constellation symbols generated by the first constellation mapper are time-division-multiplexed with constellation symbols generated by the second constellation mapper.

22. The apparatus of claim 21,
wherein the first constellation mapper is configured to use a first constellation;
wherein the second constellation mapper is configured to use a second constellation; and
wherein the first and second constellations have different respective numbers of constellation symbols.

* * * * *